US012031745B2

(12) United States Patent
McDonnell

(10) Patent No.: US 12,031,745 B2
(45) Date of Patent: Jul. 9, 2024

(54) DRAIN CLEANER APPARATUS

(71) Applicant: Joseph McDonnell, Miramar, FL (US)

(72) Inventor: Joseph McDonnell, Miramar, FL (US)

( * ) Notice: Subject to any disclaimer, the term of this patent is extended or adjusted under 35 U.S.C. 154(b) by 0 days.

(21) Appl. No.: 18/360,173

(22) Filed: Jul. 27, 2023

(65) Prior Publication Data

US 2023/0366587 A1 Nov. 16, 2023

Related U.S. Application Data

(63) Continuation of application No. 17/723,795, filed on Apr. 19, 2022, now Pat. No. 11,719,464.

(60) Provisional application No. 63/277,323, filed on Nov. 9, 2021.

(51) Int. Cl.

| | |
|---|---|
| ***F24F 13/22*** | (2006.01) |
| ***B08B 9/032*** | (2006.01) |
| *F24F 11/56* | (2018.01) |
| *F24F 11/57* | (2018.01) |
| *F24F 11/58* | (2018.01) |
| *F24F 11/89* | (2018.01) |

(52) U.S. Cl.

CPC .......... *F24F 13/222* (2013.01); *B08B 9/0325* (2013.01); *F24F 11/56* (2018.01); *F24F 11/57* (2018.01); *F24F 11/58* (2018.01); *F24F 11/89* (2018.01); *F24F 13/22* (2013.01); *F24F 2013/227* (2013.01); *F24F 2013/228* (2013.01); *F24F 2221/225* (2013.01)

(58) Field of Classification Search

CPC .......... F24F 13/222; F24F 13/22; F24F 11/57; F24F 11/89; F24F 11/56; F24F 11/58; F24F 2013/227; F24F 2013/228; F24F 2221/225; B08B 9/0325

USPC .............................. 137/238, 487.5; 222/325

See application file for complete search history.

(56) References Cited

U.S. PATENT DOCUMENTS

| | | | |
|---|---|---|---|
| 4,573,029 | A | 2/1986 | Naimer et al. |
| 4,626,951 | A | 12/1986 | Nagao |
| 4,962,778 | A | 10/1990 | Driskill |
| 5,402,813 | A | 4/1995 | Keen |
| 5,514,344 | A | 5/1996 | D'Agaro |

(Continued)

OTHER PUBLICATIONS

U.S. Notice of Allowance dated Oct. 16, 2023 for corresponding U.S. Appl. No. 17/944,662.

(Continued)

*Primary Examiner* — Minh Q Le

(74) *Attorney, Agent, or Firm* — Harness, Dickey & Pierce, P.L.C.

(57) ABSTRACT

A drain cleaner apparatus for dispensing a cleaning composition into a condensate drain line of an air handler of an air conditioning system. The drain cleaner apparatus includes an apparatus reservoir configured to hold the cleaning composition, a connector interface configured to couple with the condensate drain line to cause an apparatus outlet of the drain cleaner apparatus to be in fluid communication with an opening of the condensate drain line, a dispenser device that is configured to be actuated to selectively dispense an amount of the cleaning composition from the apparatus reservoir and through the apparatus outlet, and a controller configured to actuate the dispenser device to cause the amount of the cleaning composition to be dispensed through the apparatus outlet without manual intervention.

19 Claims, 12 Drawing Sheets

(56) References Cited

U.S. PATENT DOCUMENTS

| | | | | |
|---|---|---|---|---|
| 6,041,611 | A | 3/2000 | Palmer | |
| 6,105,638 | A | 8/2000 | Edwards et al. | |
| 6,487,867 | B1 | 12/2002 | Herren | |
| 6,892,907 | B2 | 5/2005 | Varney | |
| 7,392,658 | B1 | 7/2008 | Hardy, III | |
| 8,840,729 | B1 | 9/2014 | Herren et al. | |
| 9,289,803 | B1 | 3/2016 | Parks | |
| 9,975,152 | B1 | 5/2018 | McClarren | |
| 10,006,656 | B1 | 6/2018 | Parks | |
| 10,246,358 | B1 * | 4/2019 | Lohse | C02F 1/686 |
| 10,514,182 | B1 | 12/2019 | Oviedo | |
| 10,557,644 | B1 | 2/2020 | Steele | |
| 10,610,907 | B1 | 4/2020 | Scaringe et al. | |
| 11,285,520 | B2 | 3/2022 | McDonald et al. | |
| 11,320,172 | B1 | 5/2022 | Walker, Jr. | |
| 2003/0010381 | A1 | 1/2003 | Kimbrough et al. | |
| 2005/0269418 | A1 | 12/2005 | Fuller | |
| 2006/0038863 | A1 | 2/2006 | Piccinino et al. | |
| 2006/0222508 | A1 | 10/2006 | Cantolino | |
| 2009/0165868 | A1 | 7/2009 | Pearson | |
| 2013/0146094 | A1 | 6/2013 | Riefenstein et al. | |
| 2014/0109988 | A1 | 4/2014 | Oakner et al. | |
| 2014/0130888 | A1 | 5/2014 | Kaiser et al. | |
| 2015/0048034 | A1 | 2/2015 | Reinolds | |
| 2015/0153055 | A1 | 6/2015 | Oakner et al. | |
| 2015/0323241 | A1 | 11/2015 | Oakner et al. | |
| 2016/0325981 | A1 | 11/2016 | Diaz et al. | |
| 2017/0045282 | A1 | 2/2017 | Thornberry, Jr. | |
| 2018/0112889 | A1 | 4/2018 | Barker et al. | |
| 2018/0259222 | A1 | 9/2018 | Murphy | |
| 2019/0337027 | A1 | 11/2019 | Raynes, II | |
| 2019/0353367 | A1 | 11/2019 | Atchison | |
| 2020/0181898 | A1 | 6/2020 | Huitron | |
| 2020/0254495 | A1 * | 8/2020 | Rechlin | B08B 9/027 |
| 2020/0370772 | A1 | 11/2020 | Inoue et al. | |
| 2021/0239356 | A1 | 8/2021 | Thompson | |
| 2021/0341173 | A1 * | 11/2021 | Akiyama | F24F 8/22 |

OTHER PUBLICATIONS

Office Action dated Oct. 11, 2022 issued in corresponding U.S. Appl. No. 17/723,795.

U.S. Notice of Allowance dated Feb. 3, 2023 for corresponding U.S. Appl. No. 17/723,795.

Partial International Search Report and Provisional Written Opinion and Invitation to Pay Additional Fees dated Feb. 2, 2023 for corresponding International Application No. PCT/US2022/078747.

International Search Report and Written Opinion thereof dated Mar. 23, 2023 for corresponding International Application No. PCT/US2022/078747.

U.S. Office Action dated Apr. 28, 2023 for corresponding U.S. Appl. No. 17/944,662.

Extended European Search Report dated Jun. 5, 2023 for corresponding European Application No. 22204020.6.

U.S. Notice of Allowance dated Jun. 16, 2023 for corresponding U.S. Appl. No. 17/723,795.

U.S. Office Action dated Feb. 15, 2024 for corresponding U.S. Appl. No. 18/510,138.

U.S. Office Action dated Sep. 6, 2023 for corresponding U.S. Appl. No. 17/944,662.

U.S. Notice of Allowance dated Apr. 2, 2024 for corresponding U.S. Appl. No. 18/510,138.

International Preliminary Report on Patentability dated May 2, 2024 for corresponding International Application No. PCT/US2022/078747.

* cited by examiner

DRAIN CLEANER APPARATUS

CROSS-REFERENCE TO RELATED APPLICATIONS

This application is a continuation application of U.S. application Ser. No. 17/723,795 filed in the United States Patent and Trademark Office on Apr. 19, 2022, which claims priority to and the benefit of U.S. Provisional Patent Application No. 63/277,323 filed in the United States Patent and Trademark Office on Nov. 9, 2021, the entire contents of each of which are incorporated herein by reference.

BACKGROUND

Field

The present disclosure relates generally to air-conditioning systems, and more particularly to providing cleaner chemical compositions into condensate drain lines of air handlers of air-conditioning systems without manual intervention.

Description of Related Art

Air-conditioning systems may include an air handler, also referred to as an air handling unit (AHU) that may circulate and cool air within a space and/or structure. An air handler may move air, via operation of an air mover such as a blower or fan, to flow in thermal communication with a heat exchanger such as an air coil. The air handler may circulate a refrigerant through the heat exchanger to absorb (e.g., remove) heat from the flow of air to cool the air, and the air-conditioning system may circulate the refrigerant through a heat exchanger to discharge the absorbed heat into a heat sink (e.g., the ambient environment).

In some cases, cooling air due to the heat exchanger absorbing heat from the air may result in condensation of moisture (e.g., condensate) out of the cooled air at the heat exchanger. The condensate may be collected and discharged from the air handler via a condensate drain line.

SUMMARY

According to some example embodiments, a drain cleaner apparatus for dispensing a cleaning composition into a condensate drain line of an air handler of an air conditioning system may include an apparatus reservoir configured to hold the cleaning composition, a connector interface configured to couple with the condensate drain line to cause an apparatus outlet of the drain cleaner apparatus to be in fluid communication with an opening of the condensate drain line, a dispenser device that is configured to be actuated to selectively dispense an amount of the cleaning composition from the apparatus reservoir and through the apparatus outlet, and a controller configured to actuate the dispenser device to cause the amount of the cleaning composition to be dispensed through the apparatus outlet without manual intervention.

The dispenser device may include at least one valve that is configured to be selectively opened based on a control signal generated by the controller to establish a flow path through the at least one valve from the apparatus reservoir to the apparatus outlet.

The dispenser device may include a dispenser reservoir that is configured to hold the amount of the cleaning composition, a first valve between the apparatus reservoir and the dispenser reservoir and configured to be actuated to selectively open or close a first flow path between the apparatus reservoir and the dispenser reservoir, and a second valve between the dispenser reservoir and the apparatus outlet and configured to be actuated to selectively open or close a second flow path between the dispenser reservoir and the apparatus outlet. The controller may be configured to actuate the dispenser device based on causing the first valve to open the first flow path for a first period of time, to enable the dispenser reservoir to be filled with the amount of the cleaning composition from the apparatus reservoir, and, in response to an elapse of the first period of time, causing the first valve to close the first flow path to isolate the dispenser reservoir from the apparatus reservoir and causing the second valve to open the second flow path to enable the amount of the cleaning composition to flow from the dispenser reservoir to the apparatus outlet.

The dispenser device may include a pump that is configured to operate for a particular period of time to move the amount of the cleaning composition from the apparatus reservoir to the apparatus outlet, based on a control signal generated by the controller.

The drain cleaner apparatus may further include a structure connector that is configured to connect the drain cleaner apparatus to an external structure to at least partially hold the drain cleaner apparatus in place in relation to the opening of the condensate drain line.

The structure connector may include a magnetic bracket configured to magnetically attach to a metal surface of the external structure, and a set of lateral and vertical adjustable brackets configured to adjustably position the magnetic bracket, in both a horizontal direction and a vertical direction, in relation to a remainder of the drain cleaner apparatus.

The drain cleaner apparatus may further include a moisture sensor configured to extend through the opening into the condensate drain line based on the connector interface being connected to the condensate drain line. The moisture sensor may be configured to generate a signal based on contacting condensate backup in the condensate drain line.

The drain cleaner apparatus may further include a bypass device that is configured to be actuated to cause the air conditioning system to shut down based on the signal generated by the moisture sensor.

The controller may be configured to cause the bypass device to be actuated to cause the air conditioning system to shut down in response to the signal generated by the moisture sensor.

The drain cleaner apparatus may further include a containment tube configured to extend through the opening into the condensate drain line based on the connector interface being connected to the condensate drain line. The moisture sensor may be located within an interior of the containment tube such that the containment tube is configured to isolate the moisture sensor from generating the signal based on the cleaning composition being dispensed by the dispenser device through the apparatus outlet, and expose the moisture sensor to the condensate drain line through an open end of the containment tube, to enable the condensate backup to pass into the interior of the containment tube to contact the moisture sensor.

The drain cleaner apparatus may be configured to cause a float switch of the air handler to actuate to cause the air conditioning system to shut down based on the signal generated by the moisture sensor.

The apparatus reservoir may be configured to receive a cartridge. The cartridge may include a cartridge reservoir configured to hold the cleaning composition, and a cartridge outlet. The drain cleaner apparatus may be configured to couple with the cartridge so that the cartridge reservoir is in fluid communication with the dispensing device via the cartridge outlet.

The drain cleaner apparatus or the cartridge may include a check valve that is configured to open in response to the drain cleaner apparatus coupling with the cartridge to establish the fluid communication between the cartridge reservoir and the dispensing device via the cartridge outlet.

The controller may be configured to actuate the dispenser device in response to an elapse of a particular period of time.

The controller may be configured to repeatedly actuate the dispenser device at a fixed time interval that is the particular period of time, based on monitoring a timer that increments a timer value at a fixed frequency, actuating the dispenser device in response to the timer value reaching a particular time value corresponding to the elapse of the particular period of time, and resetting the timer value to an initial timer value in response to actuating the dispenser device.

The controller may be configured to monitor a counter that increments a counter value in response to each actuation of the dispenser device, and generate a depletion signal in response to the counter value reaching a particular counter value that corresponds to at least partial depletion of a fixed reservoir of the cleaning composition.

The drain cleaner apparatus may further include a counter reset interface that is configured to cause the counter value to be reset to an initial counter value in response to human interaction with the counter reset interface.

The drain cleaner apparatus may further include a network communication interface device that is configured to establish a network communication link with a remote computing device. The controller may be configured to cause the depletion signal to be transmitted to the remote computing device via the network communication link.

The drain cleaner apparatus may further include a network communication interface device that is configured to establish a network communication link with a remote computing device. The controller may be configured to cause the counter value to be reset to an initial counter value in response to receiving a reset signal from the remote computing device via the network communication link.

The drain cleaner apparatus may further include a network communication interface device that is configured to establish a network communication link with a remote computing device. The controller may be configured to transmit a warning signal to the remote computing device via the network communication link in response to detection of the signal generated by the moisture sensor.

The drain cleaner apparatus may further include a network communication interface device that is configured to establish a network communication link with a remote computing device. The controller may be configured to cause the air conditioning system to shut down, in response to receiving a shutdown command signal from the remote computing device via the network communication link.

The drain cleaner apparatus may further include a network communication interface device that is configured to establish a network communication link with a remote computing device. The controller may be configured to cause the dispensing device to selectively dispense the amount of the cleaning composition in response to a dispensing command signal received from the remote computing device via the network communication link.

According to some example embodiments, a method for operating a drain cleaner apparatus to dispense a cleaning composition into a condensate drain line of an air handler of an air conditioning system, where the drain cleaner apparatus is coupled with the condensate drain line such that an apparatus outlet of the drain cleaner apparatus is in fluid communication with an opening of the condensate drain line, may include controlling a dispenser device of the drain cleaner apparatus to cause the dispenser device to selectively dispense an amount of the cleaning composition from an apparatus reservoir of the drain cleaner apparatus and through the apparatus outlet without manual intervention.

The method may further include causing the air conditioning system to shut down based on processing a signal generated by a moisture sensor of the drain cleaner apparatus that extends through the opening into the condensate drain line.

The method may further include causing the air conditioning system to shut down based on processing a signal received from a remote computing device via a network communication interface of the drain cleaner apparatus.

The dispenser device may include a dispenser reservoir that is configured to hold the amount of the cleaning composition, a first valve between the apparatus reservoir and the dispenser reservoir and configured to be actuated to selectively open or close a first flow path between the apparatus reservoir and the dispenser reservoir, and a second valve between the dispenser reservoir and the apparatus outlet and configured to be actuated to selectively open or close a second flow path between the dispenser reservoir and the apparatus outlet. The method may further include actuating the dispenser device based on causing the first valve to open the first flow path for a first period of time, to enable the dispenser reservoir to be filled with the amount of the cleaning composition from the apparatus reservoir, and, in response to an elapse of the first period of time, causing the first valve to close the first flow path to isolate the dispenser reservoir from the apparatus reservoir and causing the second valve to open the second flow path to enable the amount of the cleaning composition to flow from the dispenser reservoir to the apparatus outlet.

The method may further include actuating the dispenser device in response to an elapse of a particular period of time.

The method may further include repeatedly actuating the dispenser device at a fixed time interval that is the particular period of time, based on monitoring a timer that increments a timer value at a fixed frequency, actuating the dispenser device in response to the timer value reaching a particular time value corresponding to the elapse of the particular period of time, and resetting the timer value to an initial timer value in response to actuating the dispenser device.

The method may further include monitoring a counter that increments a counter value in response to each actuation of the dispenser device, and generating a depletion signal in response to the counter value reaching a particular counter value that corresponds to at least partial depletion of a fixed reservoir of the cleaning composition.

The method may further include causing the counter value to be reset to an initial counter value in response to receiving a reset signal.

The drain cleaner apparatus may include a network communication interface device that is configured to establish a network communication link with a remote computing device. The method may further include causing the air conditioning system to shut down, in response to receiving a shutdown command signal from the remote computing device via the network communication link.

The drain cleaner apparatus may include a network communication interface device that is configured to establish a network communication link with a remote computing device. The method may further include actuating the dispensing device in response to a dispensing command signal received from the remote computing device via the network communication link.

BRIEF DESCRIPTION OF THE DRAWINGS

The various features and advantages of the non-limiting embodiments herein may become more apparent upon review of the detailed description in conjunction with the accompanying drawings. The accompanying drawings are merely provided for illustrative purposes and should not be interpreted to limit the scope of the claims. The accompanying drawings are not to be considered as drawn to scale unless explicitly noted. For purposes of clarity, various dimensions of the drawings may have been exaggerated.

DETAILED DESCRIPTION

Figure 1:
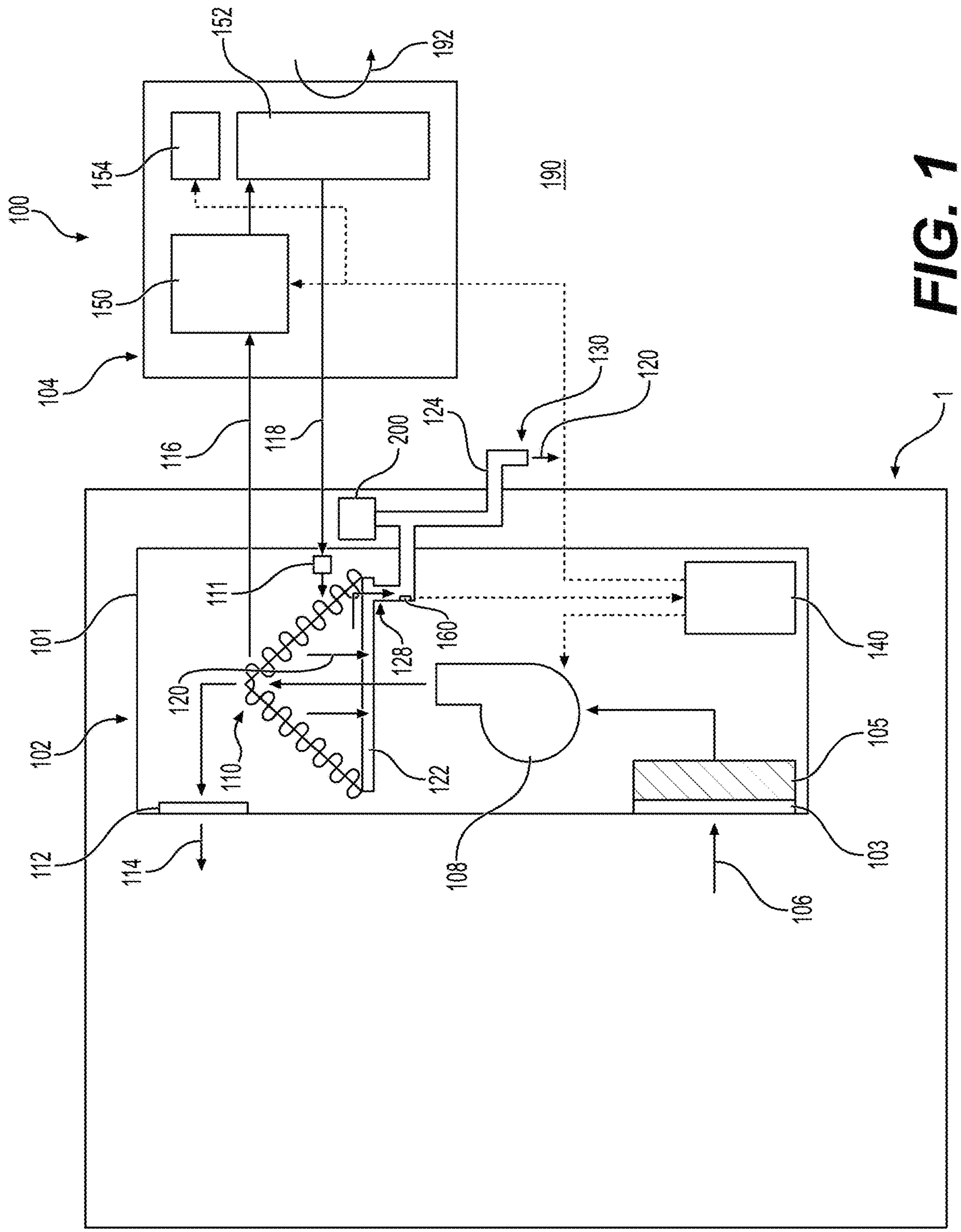
FIG. 1 is a schematic view of an air-conditioning system according to some example embodiments.

Some detailed example embodiments are disclosed herein. However, specific structural and functional details disclosed herein are merely representative for purposes of describing example embodiments. Example embodiments may, however, be embodied in many alternate forms and should not be construed as limited to only the example embodiments set forth herein.

Accordingly, while example embodiments are capable of various modifications and alternative forms, example embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments of the inventive concepts.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments belong. It will be further understood that terms, including those defined in commonly used dictionaries, should be interpreted as having a meaning that is consistent with their meaning in the context of the relevant art and will not be interpreted in an idealized or overly formal sense unless expressly so defined herein.

It will be understood that elements and/or properties thereof (e.g., structures, surfaces, directions, or the like), which may be referred to as being "perpendicular," "parallel," "flush," or the like with regard to other elements and/or properties thereof (e.g., structures, surfaces, directions, or the like) may be "perpendicular," "parallel," "flush," or the like or may be "substantially perpendicular," "substantially parallel," "substantially flush," respectively, with regard to the other elements and/or properties thereof.

Elements and/or properties thereof (e.g., structures, surfaces, directions, or the like) that are "substantially perpendicular" with regard to other elements and/or properties thereof will be understood to be "perpendicular" with regard to the other elements and/or properties thereof within manufacturing tolerances and/or material tolerances and/or have a deviation in magnitude and/or angle from "perpendicular," or the like with regard to the other elements and/or properties thereof that is equal to or less than 10% (e.g., a. tolerance of ±10%).

Elements and/or properties thereof (e.g., structures, surfaces, directions, or the like) that are "substantially parallel" with regard to other elements and/or properties thereof will be understood to be "parallel" with regard to the other elements and/or properties thereof within manufacturing tolerances and/or material tolerances and/or have a deviation in magnitude and/or angle from "parallel," or the like with regard to the other elements and/or properties thereof that is equal to or less than 10% (e.g., a. tolerance of ±10%).

Elements and/or properties thereof (e.g., structures, surfaces, directions, or the like) that are "substantially flush" with regard to other elements and/or properties thereof will be understood to be "flush" with regard to the other elements and/or properties thereof within manufacturing tolerances and/or material tolerances and/or have a deviation in magnitude and/or angle from "flush," or the like with regard to the other elements and/or properties thereof that is equal to or less than 10% (e.g., a. tolerance of ±10%).

It will be understood that elements and/or properties thereof may be recited herein as being "the same" or "equal" as other elements, and it will be further understood that elements and/or properties thereof recited herein as being "identical" to, "the same" as, or "equal" to other elements may be "identical" to, "the same" as, or "equal" to or "substantially identical" to, "substantially the same" as or "substantially equal" to the other elements and/or properties thereof. Elements and/or properties thereof that are "substantially identical" to, "substantially the same" as or "substantially equal" to other elements and/or properties thereof will be understood to include elements and/or properties thereof that are identical to, the same as, or equal to the other elements and/or properties thereof within manufacturing tolerances and/or material tolerances. Elements and/or properties thereof that are identical or substantially identical to and/or the same or substantially the same as other elements and/or properties thereof may be structurally the same or substantially the same, functionally the same or substantially the same, and/or compositionally the same or substantially the same.

It will be understood that elements and/or properties thereof described herein as being the "substantially" the same and/or identical encompasses elements and/or properties thereof that have a relative difference in magnitude that is equal to or less than 10%. Further, regardless of whether elements and/or properties thereof are modified as "substantially," it will be understood that these elements and/or properties thereof should be construed as including a manufacturing or operational tolerance (e.g., ±10%) around the stated elements and/or properties thereof.

When the terms "about" or "substantially" are used in this specification in connection with a numerical value, it is intended that the associated numerical value include a tolerance of ±10% around the stated numerical value. When ranges are specified, the range includes all values therebetween such as increments of 0.1%.

FIG. 1 is a schematic view of an air conditioning system 100 according to some example embodiments. The air conditioning system 100, which may be interchangeably referred to as an air conditioner system, air conditioner, or the like, may be configured to provide cooling of air within an interior of a structure 1 and may be at least partially located within the structure 1, but example embodiments are not limited thereto. The air conditioning system 100 may be included as a part of a Heating, ventilation, and air conditioning (HVAC) system, but example embodiments are not limited thereto, and in some example embodiments the air conditioning system 100 may be separate from any heating system.

Referring to FIG. 1, the air conditioning system 100 may include an air handler 102 and a condenser assembly 104 that are configured to draw return air 106 from an interior of the structure 1, cool (e.g., absorb heat from) the drawn return air 106 into conditioned air 114, and discharge (e.g., supply) the conditioned air 114 back into the interior of the structure 1. The air handler 102 may include, within a housing 101 that may at least partially comprise metal (e.g., steel), an air intake 103, an air filter 105, an air mover 108 (e.g., fan, blower, etc.), a heat exchanger 110 (e.g., evaporator coil), an expansion valve 111, a drip pan 122, a condensate drain line 124 (also referred to herein as a condensate drain conduit, condensate drain pipe, etc.), a controller 140, a float switch 160, and an air outlet 112. The condenser assembly 104 may include a compressor 150, a second heat exchanger 152 (e.g., condenser coil), and an air mover 154 (e.g., fan, blower, etc.).

It will be understood that example embodiments of an air conditioning system, air handler, condenser assembly, or the like may have different arrangements of devices therein and may omit or add to the aforementioned elements of the air conditioning system 100 as shown in FIG. 1. It will be understood, for example, that elements shown as being included in the air handler 102 may in some example embodiments be located in the condenser assembly 104 (e.g., the controller 140 may be located in the condenser assembly 104 instead of the air handler 102). As shown, the condenser assembly 104 may be located external to the structure 1 while the air handler 102 is located internal to the structure 1, but example embodiments are not limited thereto.

In some example embodiments, the air conditioning system 100 may draw return air 106 into the air handler 102 via the air intake 103 and through the air filter 105, where the air filter 105 may be any known air filter that is configured to remove some matter (e.g., particulate matter, including dust) from the return air 106. The air mover 108 (e.g., blower) may induce the flow of air into, through, and out of, the air handler 102. The air mover 108 may cause return air 106 to be drawn through the air filter 105 to remove some matter and may move (e.g., blow) the return air 106 through the air mover 108 and to the heat exchanger 110. The return air 106 may flow in thermal communication with (e.g., in contact with outer surfaces of) one or more coils of the heat exchanger 110 so that heat is removed from the return air 106 to cool the return air 106 into conditioned air 114. The air handler 102 may move the conditioned air 114 out of the air handler 102 and back into an interior space of the structure 1 via the air outlet 112.

The air conditioning system 100 may circulate a working fluid (e.g., a refrigerant, including known R22 refrigerant, R410A refrigerant, or any known refrigerant) between the heat exchangers 110 and 152 to remove heat from the return air 106 when the return air 106 flows in thermal communication (e.g., through and/or in contact with one or more coils of) the heat exchanger 110. The heat exchanger 110 may include any known heat exchanger used for an air conditioning system, for example an evaporator coil exchanger that includes one or more coils of one or more tubes through which the working fluid flows (e.g., as a cooled liquid). The heat exchanger 110 may cause heat to be transferred from the return air 106 and into the working fluid when the return air 106 is caused to flow across (e.g., in contact with, in thermal communication with, etc.) the one or more coils, thereby resulting in the working fluid becoming heated (e.g., heated into a low-pressure gas). The heated working fluid may be drawn, via fluid line 116 (e.g., fluid conduit, pipe, etc.) into the condenser assembly 104.

The air conditioning system 100 may include, in the condenser assembly 104, a compressor 150 (which may be any known compressor) that induces flow of the working fluid through the air conditioning system 100. The compressor 150 may draw the heated working fluid from the fluid line 118 and may compress the heated working fluid into a high-pressure gas. The heated working fluid may pass (e.g., flow), for example as the high-pressure gas, from the compressor 150 to the heat exchanger 152 (which may be any known heat exchanger and may be referred to as a condenser coil). The air mover 154 may cause ambient air 192 from the ambient environment 190 to be drawn across (e.g., in thermal communication with) one or more tubes of the heat exchanger 152 to remove heat from the heated working fluid passing through the one or more tubes of the heat exchanger 152, thereby discharging the heat originally removed from the return air 106 into the ambient environment 190 which serves as a heat sink for the air conditioning system 100. As a result, the working fluid passing through the heat exchanger 152 may be cooled back into a liquid. The working fluid may then pass (e.g., flow, circulate, etc.) back to the air handler 102 via a fluid line 118, where the working fluid may pass through an expansion valve 111 (which may be any known expansion valve) to cool the working fluid which then passes into the heat exchanger 110 to remove additional heat from return air 106.

As noted above, the circulation of working fluid through the heat exchanger 110, heat exchanger 152, fluid lines 116 and 118, and expansion valve 111 may be induced by operation of the compressor 150.

As further shown, the air conditioning system 100 may include a controller 140 that is configured to control elements of the air conditioning system 100, including for example controlling operation of the air handler 102, condenser assembly 104, or any part thereof. As described further below, the controller 140 may be implemented by a computing device, including a memory storing a program of instructions and a processor configured to execute the program of instructions. While the controller 140 is shown as being included within the housing 101 of the air handler 102, it will be understood that the controller 140 may be located external to the housing 101 and, in some example embodiments, may be located within the condenser assembly 104 or may be attached to an exterior of the air handler 102 for ease of manual access.

Still referring to FIG. 1, when heat is removed from the return air 106 based on the return air 106 passing in thermal communication with the heat exchanger 110, water may condense out of the cooled return air as condensate 120 at the heat exchanger 110. The air handler 102 may include a drip pan 122 located beneath the heat exchanger 110, and the condensate 120 may fall under gravity to collect in the drip pan 122. The air handler 102 may further include a condensate drain line 124 having an inlet opening 128 coupled to the drip pan 122 (e.g., a bottom surface where the drip pan 122 has an inclined surface that is angled downwards towards the inlet opening 128 of the condensate drain line 124) and an outlet opening 130 that is external to the structure 1 and open to the ambient environment 190, as shown. Condensate 120 collected in the drip pan 122 may pass under gravity to the inlet opening 128 of the condensate drain line 124, and the condensate drain line 124 may direct the condensate 120 to flow out of the air handler 102 and out of the structure 1 to the ambient environment 190 via the outlet opening 130 of the condensate drain line 124.

In some example embodiments, the condensate drain line 124 may become clogged due to buildup of various substances within the condensate drain line. Such substances may include, for example, mold, algae, mildew, bacteria, and/or fungi. When the condensate drain line becomes clogged, backflow and/or overflow of condensate 120 out of the condensate drain line 124 may occur. For example, condensate 120 may accumulate in the drip pan 122 due to the clogging and may eventually overflow over the sides of the drip pan 122. Such overflow of condensate 120 out of the drip pan 122 may cause damage to the air handler 102 and/or to the structure 1, including water damage to structural members of the structure 1, water damage to elements of the air handler 102, flooding of the structure 1 and/or the air handler 102, or the like.

As shown in FIG. 1, the air conditioning system 100 may include a float switch 160 that is located in the drip pan 122 and/or in the condensate drain line 124 (as shown). The float switch 160 may be a switch that is configured to be actuated based on backflow and/or overflow of condensate 120 in the condensate drain line 124. For example, the float switch 160 may be any known float switch and may be configured to be closed or opened (e.g., actuated) based on accumulation of condensate 120 in the drip pan 122 to at least a threshold volume held therein. The float switch 160 may be communicatively (e.g., electrically) coupled to the controller 140, and the controller 140 may be configured to shut down some or all of the air conditioning system 100 (e.g., shut down the air mover 108, the compressor 150, and/or the air mover 154) in response to the float switch 160 being actuated, thereby reducing or preventing damage being caused in the structure and/or air conditioning system 100 due to the condensate 120 accumulation.

Still referring to FIG. 1, in some example embodiments a drain cleaner apparatus 200 may be coupled to the condensate drain line 124 at an opening 125 into the condensate drain line 124 (e.g., a cleanout opening of the condensate drain line 124), where the drain cleaner apparatus 200 is configured to dispense a cleaning composition into the condensate drain line 124. As described herein, the drain cleaner apparatus 200 may be configured to dispense a cleaning composition into the condensate drain line 124 to reduce, remove, and/or prevent clogging of the condensate drain line 124 due to the presence of various potential clogging substances (e.g., mold, algae, mildew, bacteria, and/or fungi) therein.

In some example embodiments, the drain cleaner apparatus 200 may be configured to dispense the cleaning composition into the condensate drain line 124 without human intervention (e.g., automatically), for example to dispense discrete amounts (e.g., a particular amount, which may be a particular volume and/or particular mass) of the cleaning composition at a particular (or, alternatively, predetermined) fixed time interval, thereby reducing or preventing clogging of the condensate drain line 124 due to the presence of various potential clogging substances (e.g., mold, algae, mildew, bacteria, and/or fungi) therein while reducing or minimizing human intervention and/or effort expended to implement the dispensing. Because the drain cleaner apparatus 200 is configured to dispense the cleaning composition (e.g., repeatedly at a fixed time interval) without human intervention, the buildup of potential clogging substances (e.g., mold, algae, mildew, bacteria, and/or fungi) in the condensate drain line 124 may be reduced, removed, or prevented. This may thereby reduce or prevent the likelihood of condensate 120 backup and/or overflow which might otherwise result in shutdown of at least the air handler 102 and/or air conditioning system 100, flooding damage to the air handler 102 and/or structure 1, or the like. Because human intervention is not required to implement the dispensing of the cleaning composition, particularly dispensing of the cleaning composition repeatedly at a fixed time interval, the likelihood of condensate drain line 124 clogging due to a missed or forgotten manual dispensing of cleaning composition by a human operator is reduced or prevented, thereby improving operational performance of the air conditioning system 100 and reducing workload by a human operator.

Figure 2A:
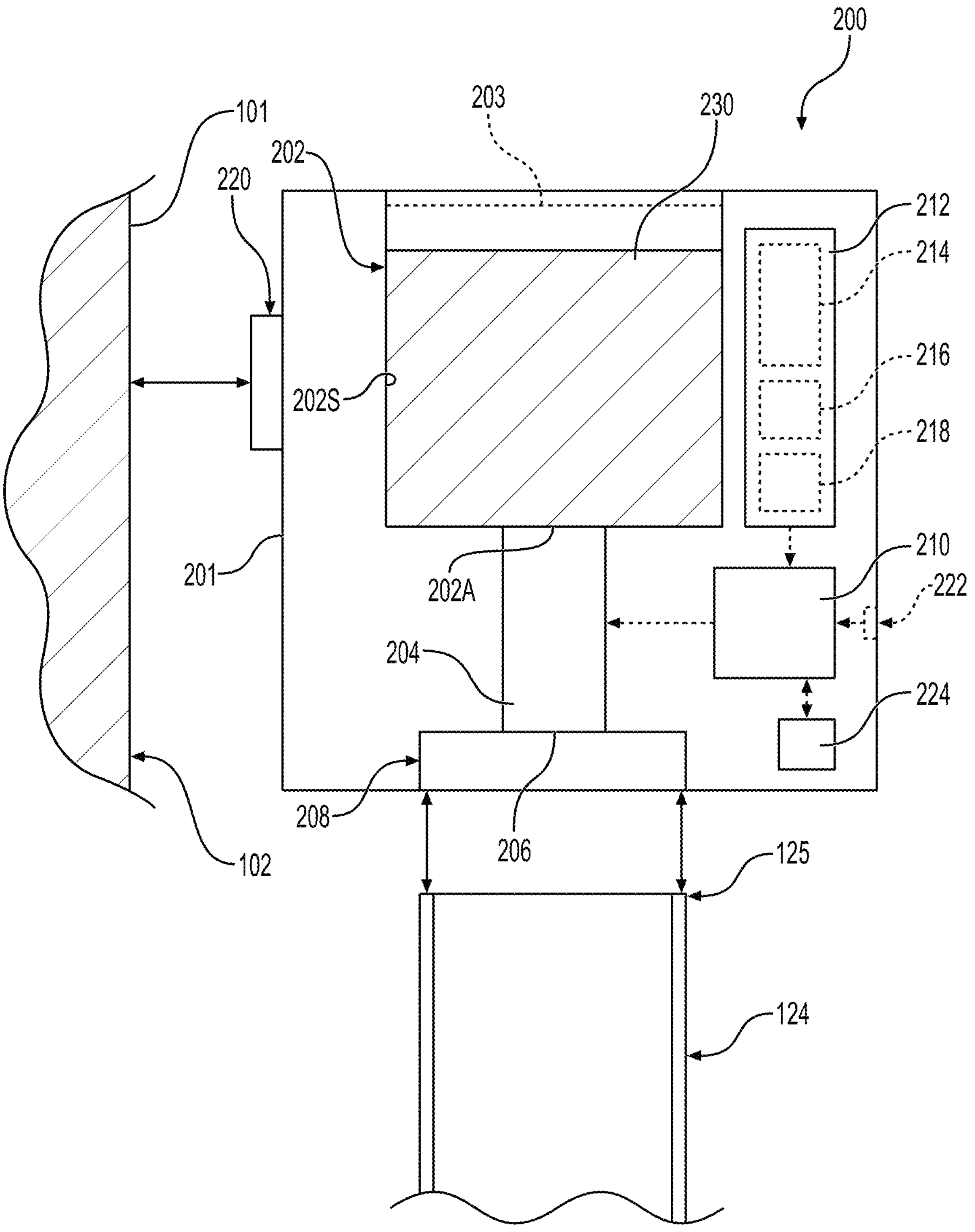
FIGS. 2A and 2B are schematic views of a drain cleaner apparatus according to some example embodiments.
Figure 2B:
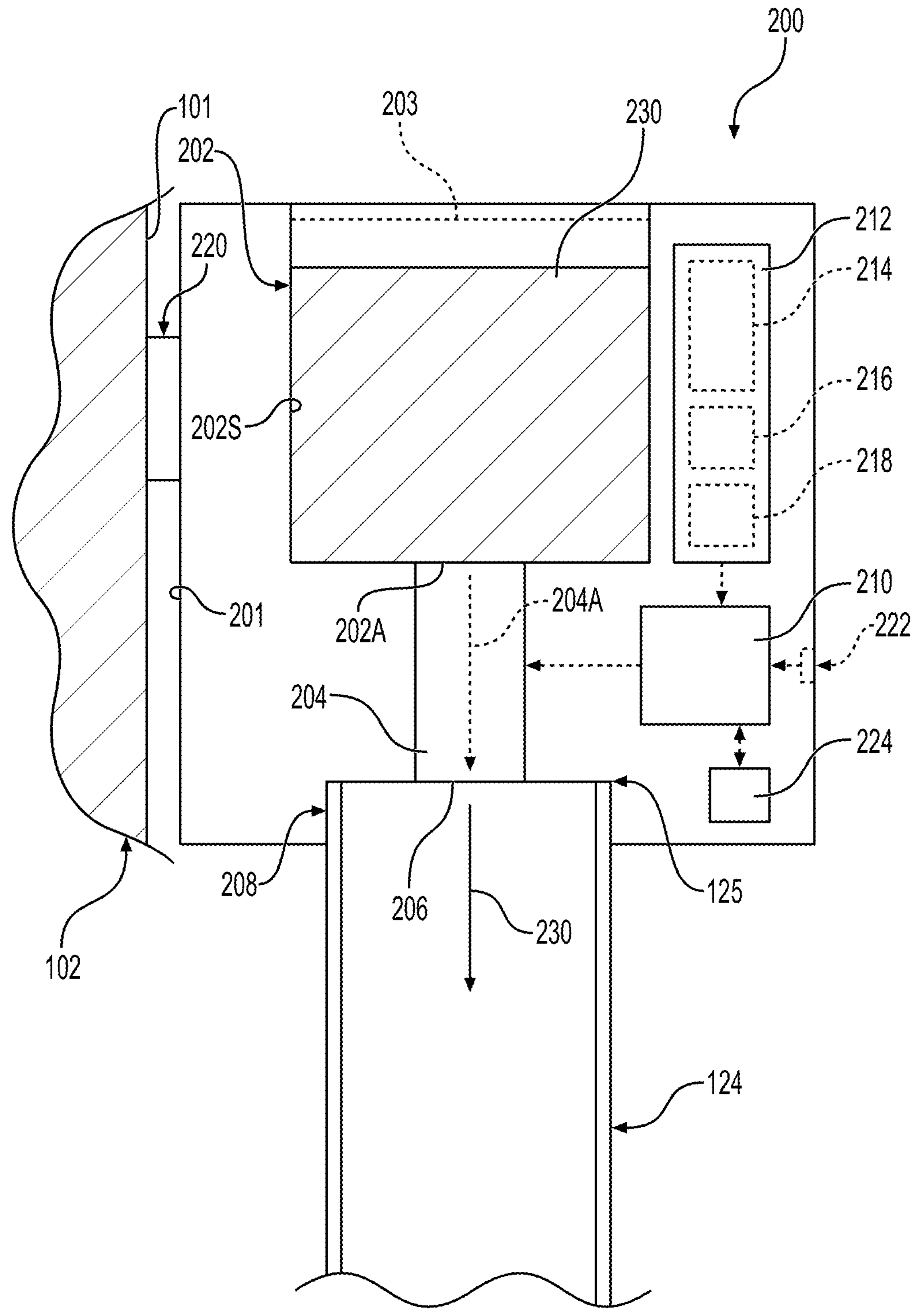

FIGS. 2A and 2B are schematic views of a drain cleaner apparatus 200 according to some example embodiments. Referring to FIGS. 2A and 2B in reference to FIG. 1, the drain cleaner apparatus 200 is configured to dispense a cleaning composition 230 into a condensate drain line 124 of the air handler 102 shown in FIG. 1.

Referring to FIGS. 2A and 2B, the drain cleaner apparatus 200 may include an apparatus reservoir 202 configured to hold the cleaning composition 230, an apparatus outlet 206 (e.g., opening), and a dispenser device 204 that is configured to be actuated (e.g., operated) to selectively dispense an amount (e.g., a particular amount, which may be a particular volume and/or a particular mass) of the cleaning composition 230 from the apparatus reservoir 202 and through the apparatus outlet 206. The drain cleaner apparatus 200 may further include a connector interface 208 that is configured to couple with the condensate drain line 124 to cause the apparatus outlet 206 of the drain cleaner apparatus 200 to be in fluid communication with (e.g., open to) the opening 125 (e.g., cleanout opening) of the condensate drain line 124.

As shown in FIGS. 2A and 2B, the apparatus reservoir 202 may include an inner surface 202S defining an interior volume space in which cleaning composition 230 may be held within a housing 201 of the drain cleaner apparatus 200. The apparatus reservoir 202 may further include an outlet 202A that is configured to be in fluid communication with the dispenser device 204 to enable cleaning composition 230 to flow from the apparatus reservoir 202 to the dispenser device 204. The apparatus reservoir 202 may further include a cover 203 (e.g., a hatch) that may be opened or removed to enable filling or refilling of the apparatus reservoir 202 with cleaning composition 230. However, it will be understood that in some example embodiments, the cleaning composition 230 may be provided within a cartridge container (e.g., "cartridge") that may be received into and held within the apparatus reservoir 202 instead of being poured directly into the apparatus reservoir 202 from outside the drain cleaner apparatus 200.

Still referring to FIGS. 2A and 2B, the dispenser device 204 is a device that may be actuated (e.g., operated, based on an electrical control signal) to selectively open or close at least one fluid path from the apparatus reservoir 202 (e.g., via outlet 202A) to the apparatus outlet 206 to enable at least an amount of the cleaning composition 230 to be dispensed through the apparatus outlet 206.

The dispenser device 204 may be configured to dispense an amount of cleaning composition 230 that is a particular amount (e.g., a particular volume, particular mass, etc.) so that the drain cleaner apparatus 200 may dispense a particular amount of cleaning composition 230 (e.g., repeatedly at a fixed time interval). For example, in some example embodiments, the amount of cleaning composition 230 as described herein that is dispensed when the dispenser device 204 is actuated once may be 3 oz of cleaning composition 230, and the dispenser device 204 may be configured to be actuated to cause the particular amount of cleaning composition 230 from the apparatus reservoir 202 to the apparatus outlet 206.

The connector interface 208 is configured to couple (e.g., removably couple, detachably couple, reversibly couple, etc.) the drain cleaner apparatus 200 with the condensate drain line 124 so that the apparatus outlet 206 is in fluid communication with the opening 125 into the condensate drain line 124, for example as shown in FIG. 2B. As shown, the connector interface 208 is configured to couple with the opening end of the condensate drain line 124 to cause the apparatus outlet 206 to be directly adjacent to, and directly open to, the opening 125 into the condensate drain line 124, so that the actuation of the dispenser device 204 to dispense an amount of the cleaning composition 230 from the apparatus reservoir 202 to the apparatus outlet 206 further causes the amount of the cleaning composition 230 to flow into the condensate drain line 124 through the apparatus outlet 206 and the opening 125 into the condensate drain line 124.

In some example embodiments, the connector interface 208 may be any connector that is configured to couple at least the housing 201 of the drain cleaner apparatus 200 with the condensate drain line 124. In some example embodiments, the connector interface 208 may be a friction fit connector interface that includes an inner surface having an inner diameter that corresponds to the outer diameter of the opening end of the condensate drain line 124, so that the connector interface 208 is configured to establish a friction fit connection with the opening 125. The connector interface 208 may further include a seal, O-ring, or the like along the inner surface of the connector interface 208 to further establish a connection with the opening 125. In some example embodiments, the connector interface 208 includes a threaded connector, bayonet connector, or the like that is configured to be coupled with a complementary connector interface of the condensate drain line 124 (e.g., a threaded connector, bayonet connector, or the like at the opening 125 of the condensate drain line 124). In some example embodiments, the connector interface 208 may include an adaptor (e.g., a variable inner diameter connector) that is configured to couple the drain cleaner apparatus 200 to various condensate drain lines 124 having various outer diameters. In some example embodiments, the connector interface 208 is configured to at least partially transfer a structural load (e.g., weight) of the drain cleaner apparatus 200 to the condensate drain line 124, so that the drain cleaner apparatus 200 is configured to be at least partially structurally supported in place on the condensate drain line 124.

In some example embodiments, the drain cleaner apparatus 200 includes an structure connector 220 that is configured to connect the drain cleaner apparatus 200 to an external structure (e.g., a housing 101 of the air handler 102 as shown) to at least partially hold the drain cleaner apparatus 200 in place in relation to the opening 125 of the condensate drain line 124 (e.g., at least partially structurally support the drain cleaner apparatus 200 on the opening 125). As described further herein, the structure connector 220 may have various structures. For example, the structure connector 220 may include an adhesive connector, a magnet, or the like to couple with the housing 101 of the air handler 102.

In some example embodiments, the dispenser device 204 may include at least one valve that is configured to be actuated to be selectively opened (e.g., to selectively open a flow path 204A through the at least one valve) based on a control signal generated by the controller 210 to establish a flow path 204A through the at least one valve and through which the cleaning composition 230 may flow (e.g., a flow path 204A from the apparatus reservoir 202 to the apparatus outlet 206). For example, a valve of the dispense device 204 as described herein may include an electromechanically operated valve, including a solenoid valve, which may be selectively actuated based on a control signal from the controller 210.

In some example embodiments, the dispenser device 204 may include a pump (e.g., any known positive displacement pump) that is configured to operate for a particular period of time to move the amount of the cleaning composition 230 from the apparatus reservoir 202 to the apparatus outlet 206, based on a control signal generated by the controller 210.

As described herein, a cleaning composition 230 may be any known chemical composition (e.g., solution, liquid, fluid, etc.) that may be configured to clean (e.g., remove) potential clogging substances (e.g., mold, algae, mildew, bacteria, and/or fungi) from an inner surface of the condensate drain line 124. In some example embodiments, the cleaning composition 230 may be a chemical substance that is or includes a chelating agent (e.g., chelant) including, for example, sodium hexametaphosphate, that is configured to remove potential clogging substances from the inner surface of the condensate drain line based on chelation upon contact with the potential clogging substances. For example, the cleaning composition 230 may be a liquid solution that includes 3%-7% sodium hexametaphosphate, by weight of the total weight of the cleaning composition 230. Based on the drain cleaner apparatus 200 being configured to dispense cleaning composition 230 through the apparatus outlet 206, where the cleaning composition 230 is dispensed into the condensate drain line 124, the drain cleaner apparatus 200 may be configured to enable removal of potential clogging substances (e.g., mold, algae, mildew, bacteria, and/or fungi) from an inner surface of the condensate drain line 124 by the cleaning composition 230, which may thereby reduce or prevent the occurrence of backflow and/or overflow of the condensate drain line 124 due to clogging.

As shown in FIGS. 2A and 2B, the drain cleaner apparatus 200 may include a power supply 212 that is configured to supply electrical power to devices included therein, including the controller 210, the dispenser device 204, a network communication interface 224, a sensor (not shown in FIGS. 2A and 2B, shown in FIG. 5), or the like. As shown, the power supply 212 may include a battery 214, which may include any known rechargeable battery (e.g., a lithium ion battery). As further shown, in some example embodiments the power supply 212 may include a wired power connection 216 which may be configured to couple to a power outlet provided at the structure 1 and/or the air handler 102. The power supply 212 may further include a charging circuit 218 that may be configured to recharge the battery 214 from the wired power connection 216 and may be configured to enable the battery 214 to supply power to operate the drain cleaner apparatus 200 in the absence of electrical power being received via the wired power connection 216.

As shown in FIGS. 2A and 2B, the controller 210 may be configured to actuate the dispenser device 204 to cause a particular amount of the cleaning composition 230 to be dispensed from the apparatus reservoir 202 and through the apparatus outlet 206 without manual intervention. For example, the controller 210 may be configured to cause an electrical signal to be generated and transmitted to the dispenser device 204 to cause the dispenser device 204 to actuate, selectively opening or closing a flow path 204A therethrough, to thus cause a particular amount of the cleaning composition 230 to be dispensed.

The controller 210 may include a memory (e.g., a solid state drive, or SSD) storing a program of instructions, and the controller 210 may include a processor (e.g., a Central Processing Unit, or CPU) configured to execute the program of instructions to implement any functionality of the controller 210 according to any example embodiments. However, example embodiments are not limited thereto. For example, in some example embodiments, the controller 210 may include circuitry that is configured to implement a timer circuit (e.g., a clock, timer, or any combination thereof) and is configured to generate a signal to actuate the dispenser device 204 based on the timer circuit counting a particular time interval.

In some example embodiments, the controller 210 is configured to actuate the dispenser device 204 (e.g., actuate at least one valve, pump, or the like therein) to cause the dispenser device 204 to dispense an amount of cleaning composition 230 through the apparatus outlet 206 to be dispensed into the condensate drain line 124. In some example embodiments, the controller 210 may be configured to generate a signal to cause at least a portion of the dispenser device 204 (e.g., a valve, pump, etc.) to be operated (e.g., a valve opened, a pump operating) for a particular period of time that is associated, at the controller 210, with causing a particular amount of cleaning composition 230 to be dispensed by the dispenser device 204. The controller 210 may cause a particular amount of cleaning composition 230 to be dispensed based on accessing a look-up-table that is stored in a memory of the controller 210, where the look-up-table is empirically generated and associates a period of time of actuation of at least a portion of the dispensing device (e.g., a period of time of generation of a control signal) with dispensing of a corresponding amount of cleaning composition 230 by the dispenser device 204. The controller 210 may determine a particular amount of cleaning composition 230 to be dispensed, access the look-up-table to determine a corresponding duration or period of applied control signal to the dispenser device 204, and then generate a control signal that is transmitted to the dispenser device 204 to cause at least a portion of the dispenser device 204 to be actuated for the corresponding duration or period.

In some example embodiments, the controller 210 is configured to actuate the dispenser device 204 to cause an amount of cleaning composition 230 (e.g., 3 oz) to be dispensed in response to an elapse of a particular period of time (e.g., 7 days, or 168 hours). The controller 210 may be configured to actuate the dispenser device 204 repeatedly upon repeated elapse of the particular period of time, which may be referred to as a "fixed time interval" (e.g., a fixed time interval of 7 days). In some example embodiments, the apparatus reservoir 202 may be configured to hold a total volume of 36 oz, so that the drain cleaner apparatus 200 may be configured to dispense 3 oz of cleaning composition 230 every 7 days for a period of 12 weeks (84 days).

The controller 210 may be configured to repeatedly actuate the dispenser device 204 at a fixed time interval (e.g., 7 days), based on monitoring a timer that increments a timer value at a fixed frequency, actuating the dispenser device 204 in response to the timer value reaching a particular time value corresponding to the elapse of the particular period of time, and resetting the timer value to an initial timer value (e.g., 0 days) in response to actuating the dispenser device 204. For example, the controller 210 may include and/or implement a clock and/or timer that counts a period of elapsed time from an initial timer value (e.g., increments from 0 days) at a fixed frequency (e.g., counts days, hours, minutes and/or seconds at a fixed frequency of days, hours, minutes and/or seconds). In response to determining that a threshold timer value is reached (e.g., a timer value corresponding to the particular period of time and/or fixed time interval of 7 days), the controller 210 may generate a signal to cause the dispenser device 204 to actuate to cause an amount of the cleaning composition 230 to be dispensed through the apparatus outlet 206 and further re-set the timer value so that the controller 210 may subsequently cause the dispenser device 204 to dispense another amount of the cleaning composition 230 upon a re-elapse of the particular period of time. The controller 210 may be configured to perform this process repeatedly so long as electrical power is supplied to the controller 210 (e.g., from power supply 212), so that the process may be performed (e.g., repeatedly at a fixed time interval) without human intervention.

In some example embodiments, the controller 210 is configured to implement a counter that increments a counter value, starting from an initial value (e.g., 0), in response to each actuation of the dispenser device 204. As a result, where the controller 210 repeatedly actuates the dispenser device 204 at a fixed time interval, the controller 210 may track the number (e.g., quantity) of dispensings of an amount of cleaning composition 230 (e.g., the number of actuations of the dispenser device 204) over time. Therefore, where the drain cleaner apparatus 200 is configured to hold a particular total amount of cleaning composition 230 (e.g., 36 oz), the controller 210 may track the counter value to determine when the total amount of cleaning composition 230 available to be dispensed is about to be depleted or is depleted and may generate a signal (e.g., a depletion signal) in response to the counter value reaching a value that corresponds to partial or complete (e.g., total, final, etc.) depletion of the cleaning composition 230 held by the drain cleaner apparatus 200.

For example, where the drain cleaner apparatus 200 is configured to hold a particular total amount of cleaning composition 230 that is 36 oz, and where the controller 210 is configured to cause the dispenser device 204 to dispense an amount of 3 oz of cleaning composition 230 at a fixed time interval of 7 days, the total amount of cleaning composition 230 may be depleted upon completion of 12 dispensings. The controller 210 may store a threshold counter value of 10, 11, or 12 that corresponds to partial depletion, near-depletion, or total depletion of the total amount of cleaning composition 230 held in the drain cleaner apparatus 200. The controller 210 may implement and/or monitor a counter that increments a counter value in response to each actuation of the dispenser device 204, and generate a depletion signal in response to the counter value reaching a particular counter value that corresponds to at least partial depletion of a fixed reservoir of the cleaning composition (e.g., 10, 11, or 12). As described herein, the controller 210 may transmit the depletion signal to a display interface (e.g., an LED, an audio speaker), which may be included in the drain cleaner apparatus 200 or may be included in a remote computing device, to provide a depletion warning. The controller 210 may further or alternatively be configured to cause the depletion signal to a remote computing device (e.g., via a network communication interface 224 as described herein) in order to inform a remote human user supported by the remote computing device of the partial or complete depletion (e.g., final depletion) of the total amount of cleaning composition 230 held in the drain cleaner apparatus 200. The human user may then be informed of the partial or complete depletion so that the human user may take action to replenish the cleaning composition held in the drain cleaner apparatus 200.

Additionally, the drain cleaner apparatus 200 may include a counter reset interface 222 (e.g., a button) that is configured to cause the counter value to be reset to an initial counter value (e.g., 0) in response to human interaction with the counter reset interface 222 (e.g., in response to a human user pushing the button after replenishing the total amount of cleaning composition 230 held in the drain cleaner apparatus 200).

Still referring to FIGS. 2A and 2B, the drain cleaner apparatus 200 may include a network communication interface 224 that is communicatively coupled to the controller 210. It will be understood that the network communication interface 224 may be separate from the controller 210 as shown or may be included in and/or implemented by the controller 210. The network communication interface 224 may be any known network communication transceiver, including a wireless network communication transceiver such as a WI-FI transceiver, 5G cellular network communication transceiver, an ad hoc network communication transceiver such as a Bluetooth® transceiver, any combination thereof, or the like.

The controller 210 may be configured to establish a network communication link (which may be a wired network communication link, a wireless network communication link, an ad hoc wireless network communication link, or the like) with a remote computing device as described herein and may engage in one-way or two-way communication with the remote computing device via the network communication link.

In some example embodiments, the controller 210 may communicate signals over the network communication link that indicate operations of the controller 210 (e.g., indicating actuation of the dispenser device 204 at particular points in time, a present timer value, a present counter value, etc.). In some example embodiments, the controller 210 may communicate the depletion signal (generated in response to the counter value reaching a threshold value) to the remote computing device via the network communication link.

In some example embodiments, the controller 210 may be configured to perform operations in response to receiving signals from the remote computing device via the network communication link. For example, the controller 210 may be configured to cause the counter value of the counter value to be reset to an initial counter value (e.g., 0) in response to receiving a reset signal from the remote computing device via the network communication link (which may be transmitted by the remote computing device in response to a human user replenishing the total amount of cleaning composition 230 held in the drain cleaner apparatus 200).

Figure 3A:
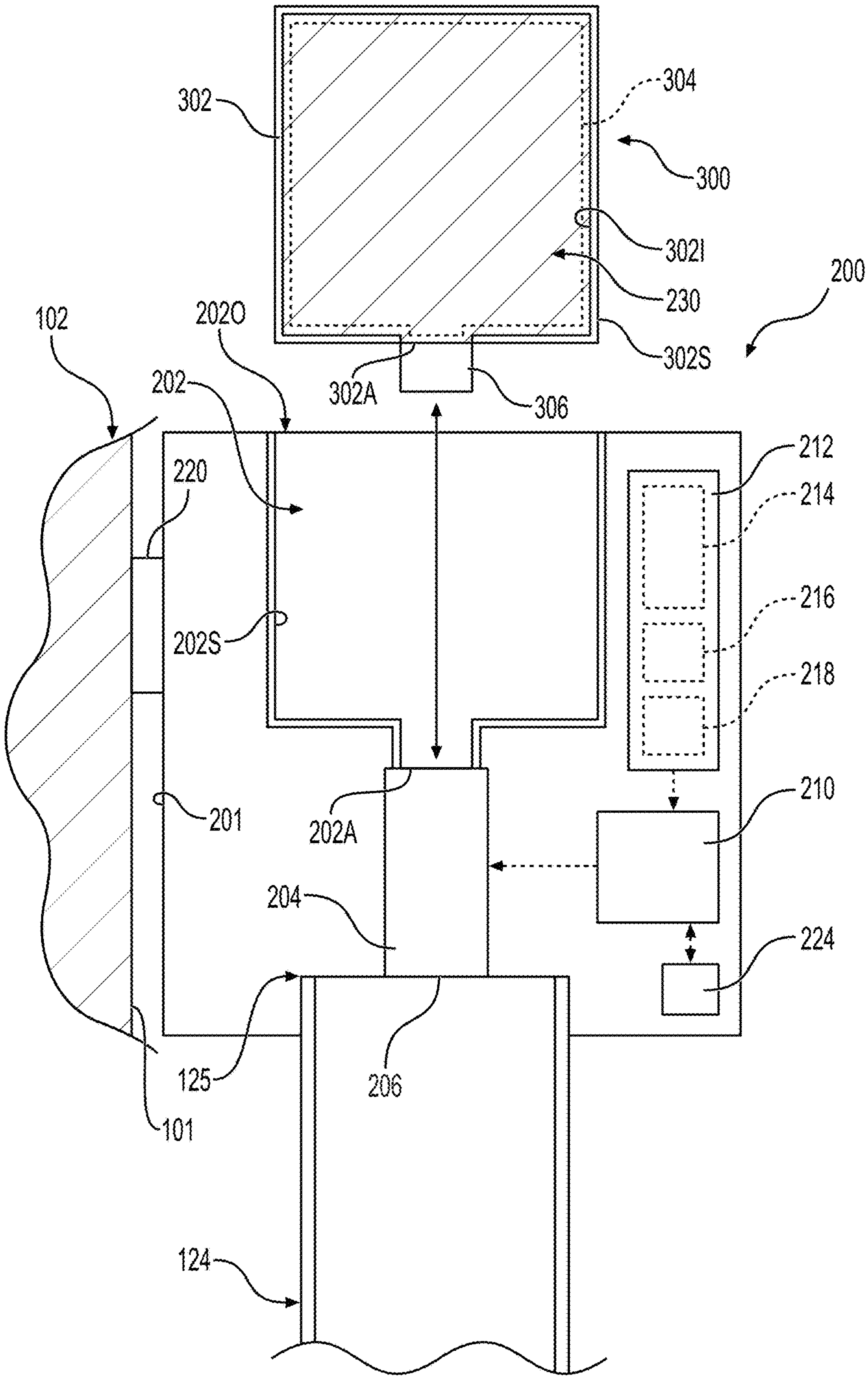
FIGS. 3A and 3B are schematic views of a drain cleaner apparatus and a cartridge according to some example embodiments.
Figure 3B:
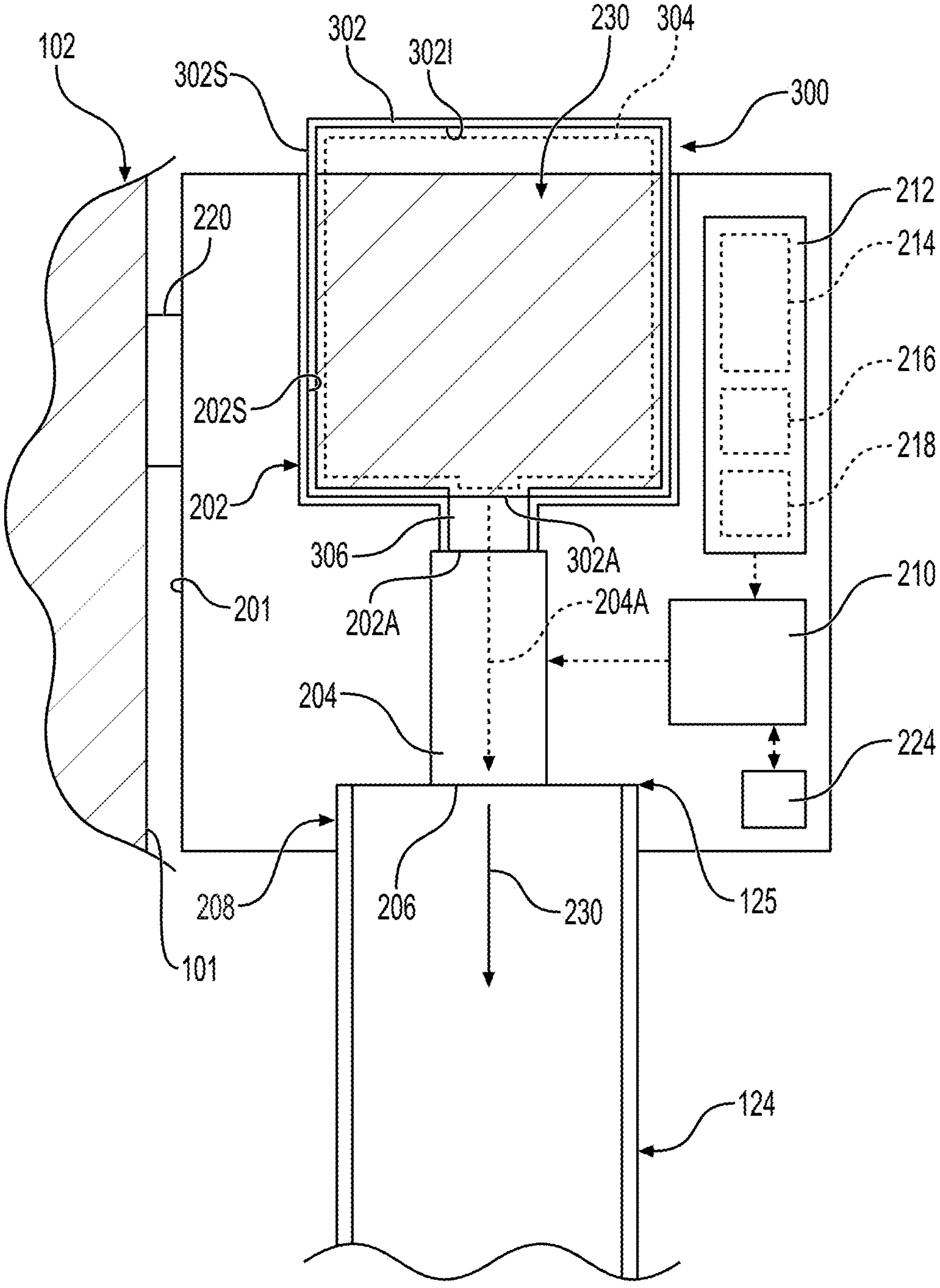

FIGS. 3A and 3B are schematic views of a drain cleaner apparatus 200 and a cartridge 300, also referred to interchangeably as a "cleaner cartridge," "cleaning composition cartridge," or the like according to some example embodiments. Referring to FIGS. 3A and 3B in reference to FIG. 1, the drain cleaner apparatus 200 is configured to dispense a cleaning composition 230 into a condensate drain line 124 of the air handler 102 shown in FIG. 1. The drain cleaner apparatus 200 shown in FIGS. 3A and 3B may include some or all of the same elements as the drain cleaner apparatus of any of the example embodiments.

In some example embodiments, the drain cleaner apparatus 200 may be configured to receive and couple with a cartridge 300 that contains (e.g., holds) the cleaning composition 230 within a cartridge reservoir 304 such that a flow path is established between the cartridge reservoir 304 and the dispenser device 204. The cartridge 300 may be provided instead of the cleaning composition 230 being poured into, and directly held within, the apparatus reservoir 202 in contact with the inner surface 202S thereof, for example as shown in FIGS. 2A and 2B. Replenishment of the cleaning composition 230 held in the drain cleaner apparatus 200 may be simplified based on the cleaning composition 230 being held in the cartridge 300, as replenishment of the total cleaning composition 230 held in the drain cleaner apparatus 200 may involve replacing a cartridge 300 that is coupled to the drain cleaner apparatus 200 based on being inserted into the apparatus reservoir 202 instead of directly pouring the cleaning composition 230 directly into the apparatus reservoir 202. Such simplification may include reducing or preventing inadvertent spilling of cleaning composition 230 during the replenishment process.

As shown in FIGS. 3A and 3B, the cartridge 300 may include a cartridge housing 302 that has at least an inner surface 3021 defining a cartridge reservoir 304 which may hold the cleaning composition 230 therein. In some example embodiments, the cartridge reservoir 304 may have a particular volume, for example 36 oz and thus may be configured to hold the particular volume (e.g., 36 oz) of cleaning composition 230.

As further shown, the apparatus reservoir 202 and the cartridge 300 may be sized and shaped so that the cartridge 300 may be received at least partially into the apparatus reservoir 202 to establish a sliding contact fit between the outer surface 302S of the cartridge housing 302 and the inner surface 202S of the apparatus reservoir 202, for example so that the cartridge 300 occupies all or substantially all of the internal volume space of the apparatus reservoir 202 when the cartridge 300 is coupled to the drain cleaner apparatus 200.

As shown in FIGS. 3A and 3B, the cartridge 300 may have a greater volume than the apparatus reservoir 202 and may protrude out of the opening 2020 of the apparatus reservoir 202 when the cartridge 300 is received into the apparatus reservoir 202 and coupled with the drain cleaner apparatus 200. Such protrusion of the cartridge 300 may enable easier human access to grasp the cartridge 300 to simplify replacement of cartridges 300, but example embodiments are not limited thereto: in some example embodiments the cartridge 300 may be located entirely within the apparatus reservoir 202 when the cartridge 300 is coupled to the drain cleaner apparatus 200.

As shown in FIGS. 3A and 3B, the drain cleaner apparatus 200 may include the apparatus reservoir 202 which is configured to receive the cartridge 300 to enable the cartridge 300 to be coupled with the drain cleaner apparatus 200, but example embodiments are not limited thereto. For example, in some example embodiments, the apparatus reservoir 202 may be entirely absent from the drain cleaner apparatus 200, and the cartridge 300 may couple with a port that is exposed at the outer surface of the housing 201 of the drain cleaner apparatus 200 to put the cartridge reservoir 304 in fluid communication with the dispenser device 204.

As shown, the cartridge 300 may have a cartridge housing 302 that defines a cartridge outlet 302A through which the cleaning composition 230 may exit the cartridge reservoir 304 when a flow path is established between the cartridge reservoir 304 and the dispenser device 204.

The cartridge outlet 302A may include a connector interface configured to establish a connection with the dispenser device 204, and the dispenser device 204 or the apparatus reservoir 202 may further include a complementary connector interface to enable a complementary connection with the cartridge 300. Such connector interfaces may include any known connector interface, for example a friction fit connector, a threaded connector, a bayonet connector, any combination thereof, or the like.

As further shown, at least one of the cartridge 300 or the drain cleaner apparatus 200 may include a check valve 306 that is configured to be opened based on the drain cleaner apparatus 200 being coupled with the cartridge 300 (e.g., in response to establishing a threaded connection, bayonet connection, friction fit connection, or the like between the drain cleaner apparatus 200 and the cartridge 300). The check valve 306 may be configured to actuate to open a flow path between the cartridge reservoir 304 and the apparatus reservoir 202 and/or between the cartridge reservoir 304 and the dispenser device 204 in response to the drain cleaner apparatus 200 being coupled with the cartridge 300, so that the cartridge reservoir 304 is in fluid communication with the dispenser device 204 via the cartridge outlet 302A.

While, in FIGS. 3A and 3B, the check valve 306 is shown as being a part of the cartridge 300 such that the check valve 306 is fixed to the cartridge housing 302 (e.g., via adhesive and/or the cartridge housing 302 being a plastic material (e.g., high density polyethylene or HDPE) that is formed to at least partially enclose the check valve 306), example embodiments are not limited thereto. For example, in some example embodiments, the check valve 306 may be fixed to the apparatus reservoir 202 and/or the dispenser device 204. The check valve 306 may be included in a connector that is configured to couple with the cartridge 300 to establish the coupling between the drain cleaner apparatus 200 and the cartridge 300. For example the check valve 306 may be included in a threaded connector, bayonet connector, friction fit connector, or the like. In another example, the check valve 306 may be removably (e.g., detachably) coupled to the apparatus reservoir 202 and/or the dispenser device 204 via a set of complementary connectors (e.g., threaded, bayonet, etc.), and the check valve 306 may be detached from the drain cleaner apparatus 200 and coupled to the cartridge 300 prior to coupling of the drain cleaner apparatus 200 with the cartridge 300, and the check valve 306 may be detached from the cartridge 300 subsequent to removal of an empty cartridge 300 from the drain cleaner apparatus 200 and then attached to a new, full cartridge 300 prior to coupling of the full cartridge 300 to the drain cleaner apparatus 200, such that a check valve 306 may be re-used between separate cartridges 300.

Accordingly, in some example embodiments, the apparatus reservoir 202 may be configured to receive a cartridge 300 that includes a cartridge reservoir 304 configured to hold the cleaning composition 230, and a cartridge outlet 302A, and the drain cleaner apparatus 200 may be configured to couple with the cartridge 300 so that the cartridge reservoir 304 is in fluid communication (e.g., via an open flow channel) with the dispenser device 204 via the cartridge outlet 302A. Additionally, in some example embodiments, the drain cleaner apparatus 200 or the cartridge 300 may include a check valve 306 that is configured to open in response to the drain cleaner apparatus 200 coupling with the cartridge 300 to establish the fluid communication between the cartridge reservoir 304 and the dispenser device 204 via the cartridge outlet 302A.

It will be understood that the dispenser device 204, the controller 210, the power supply 212, and/or the network communication interface 224 of the drain cleaner apparatus 200 of FIGS. 3A and 3B may be configured to operate similarly to the described operation thereof as presented herein with reference to the example embodiments shown in FIGS. 2A and 2B, except that replenishment of cleaning composition 230 held in the drain cleaner apparatus 200 is implemented via replacing the cartridge 300 coupled to the drain cleaner apparatus 200 instead of directly pouring cleaning composition 230 into the apparatus reservoir 202. It will further be understood that the dispenser device 204, the controller 210, the power supply 212, and/or the network communication interface 224 of the drain cleaner apparatus 200 of any of the example embodiments may be configured to operate similarly to the described operation thereof as presented herein with reference to the example embodiments shown in FIGS. 2A and 2B.

Figure 4:
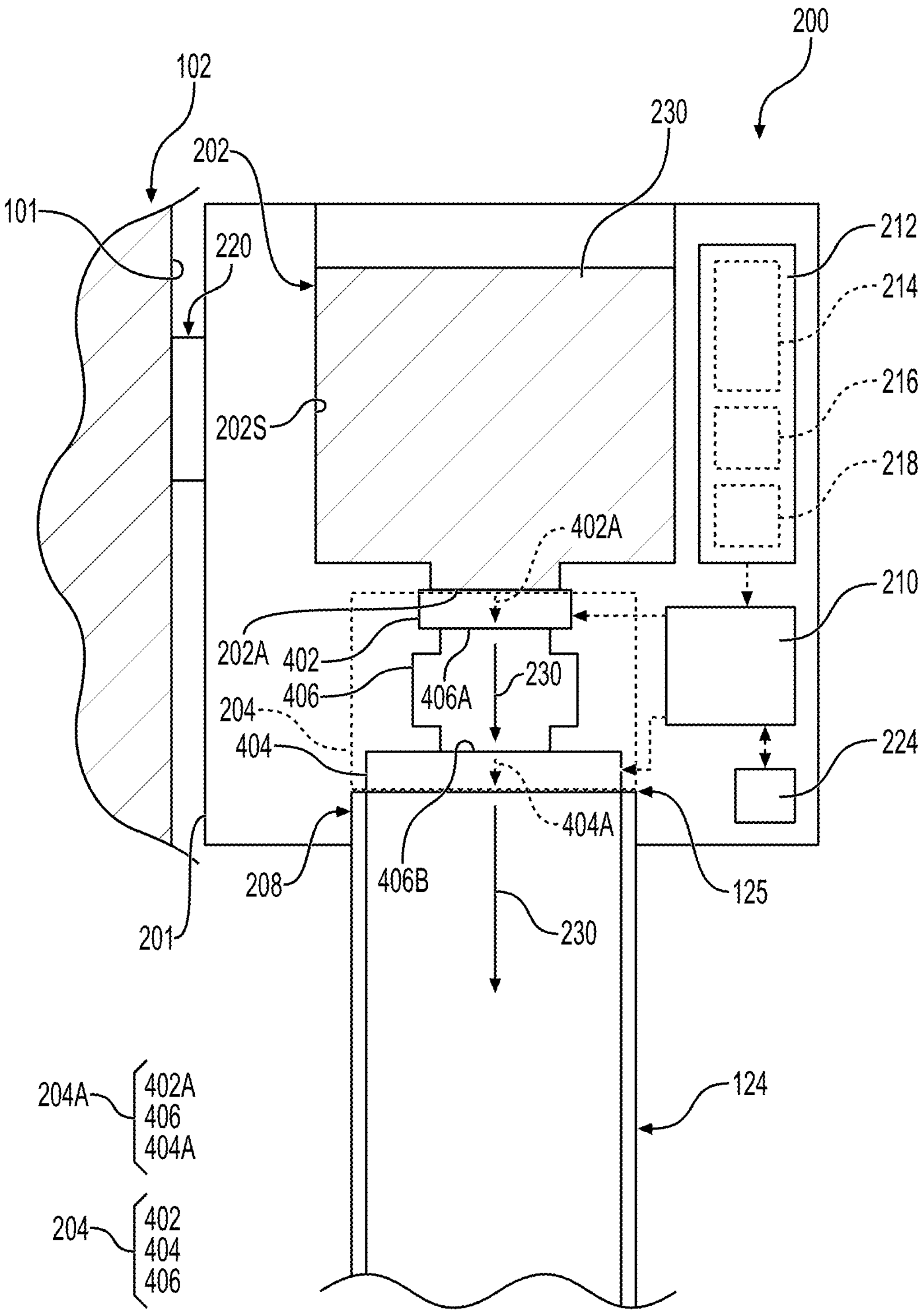
FIG. 4 is a schematic view of a drain cleaner apparatus including a dispenser device that further includes first and second valves and a dispenser reservoir according to some example embodiments.

FIG. 4 is a schematic view of a drain cleaner apparatus 200 including a dispenser device 204 that further includes first and second valves 402 and 404 and a dispenser reservoir 406 according to some example embodiments. Referring to FIG. 4 in reference to FIG. 1, the drain cleaner apparatus 200 is configured to dispense a cleaning composition 230 into a condensate drain line 124 of the air handler 102 shown in FIG. 1.

The drain cleaner apparatus 200 shown in FIG. 4 may include some or all of the same elements as the drain cleaner apparatus of any of the example embodiments. For example, the example embodiments shown in FIG. 4 include an apparatus reservoir 202 configured to directly hold cleaning composition 230, similarly to the example embodiments shown in FIGS. 2A and 2B, but it will be understood that the drain cleaner apparatus 200 shown in FIG. 4 may be configured to couple with a cartridge 300 as shown in FIGS. 3A and 3B instead of cleaning composition 230 being directly held (e.g., poured into) the apparatus reservoir 202 and/or the apparatus reservoir 202 may be entirely absent (e.g., where the dispenser device 204 is configured to couple with a cartridge 300 that is external to housing 201). Conversely, it will be understood that the drain cleaner apparatus 200 according to any of the example embodiments (e.g., the example embodiments shown in FIGS. 2A and 3B, the example embodiments shown in FIGS. 3A and 3B, or the like) may include the dispenser device 204 as shown in FIG. 4.

Referring to FIG. 4, in some example embodiments, the dispenser device 204 may include a dispenser reservoir 406 that is configured to hold the particular amount of the cleaning composition 230 that is to be dispensed when the dispenser device 204 is actuated. For example, the dispenser reservoir (which may be a container having two openings 406A and 406B as shown) may have an internal volume of exactly or about 3 oz.

The dispenser device 204 may include a first valve 402 between the apparatus reservoir 202 and the dispenser reservoir 406. The dispenser device 204 may further include a second valve 404 between the dispenser reservoir 406 and the apparatus outlet 206. As shown, the dispenser reservoir 406 may be directly between the first and second valves 402 and 404, where a first opening 406A of the dispenser reservoir 406 is connected to an outlet of the first valve 402 and the second opening 406B of the dispenser reservoir 406 is connected to an inlet of the second valve 404. The first and second valves 402 and 404 may each be any known type of valve, including for example a solenoid valve.

In some example embodiments, the first valve 402 is configured to be actuated (e.g., based on a control signal generated by the controller 210) to selectively open or close a first flow path 402A between the apparatus reservoir 202 and the dispenser reservoir 406, and the second valve 404 may be configured to be actuated (e.g., based on a separate control signal generated by the controller 210) to selectively open or close a second flow path 404A between the dispenser reservoir 406 and the apparatus outlet 206.

In some example embodiments, the controller 210 may be configured to actuate the dispenser device 204 based on causing the first valve 402 to open the first flow path 402A for a first period of time, to enable the dispenser reservoir 406 to be filled with an amount of the cleaning composition 230 from the apparatus reservoir 202. The controller 210 may cause the first valve 402 to remain open for a first period of time that is sufficiently long to fill the dispenser reservoir 406 from the apparatus reservoir 202 (and/or cartridge 300 in example embodiments where the drain cleaner apparatus 200 is configured to be coupled to a cartridge 300 as described with regard to FIGS. 3A and 3B) regardless of the amount of cleaning composition 230 held in the apparatus reservoir 202 (directly and/or via a cartridge 300 coupled to the drain cleaner apparatus 200), so that the dispenser reservoir 406 holds an amount of cleaning composition 230 that corresponds to (e.g., matches) the internal volume of the dispenser reservoir 406.

In some example embodiments, the controller 210 may be configured to, in response to an elapse of the first period of time, cause the first valve 402 to close the first flow path 402A to isolate the dispenser reservoir 406 from the apparatus reservoir 202, and cause the second valve 404 to open the second flow path 404A to enable the amount of the cleaning composition 230 held in the dispenser reservoir 406 to flow from the dispenser reservoir 406 to the apparatus outlet 408. As a result, the dispenser device 204 may be configured to cause an amount of cleaning composition 230 that is dispensed at each actuation of the dispenser device 204 to be controlled to be a particular amount which corresponds to the specific internal volume of the dispenser reservoir 406, so that the drain cleaner apparatus 200 is configured to improve the uniformity of the amount of cleaning composition 230 dispensed at each actuation of the dispenser device 204.

Figure 5:
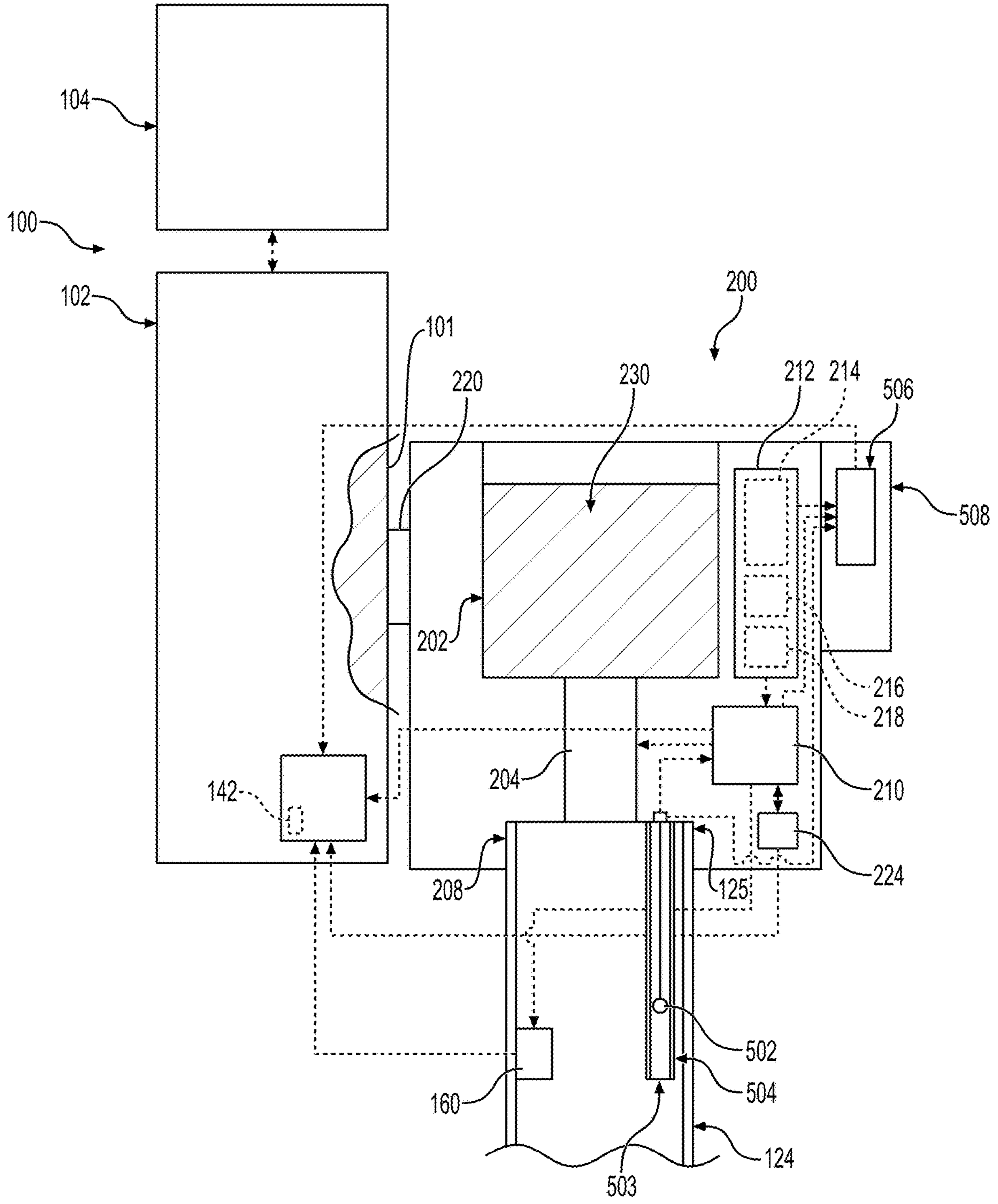
FIG. 5 is a schematic view of a drain cleaner apparatus including a moisture sensor according to some example embodiments.

FIG. 5 is a schematic view of a drain cleaner apparatus 200 including a moisture sensor 502 according to some example embodiments. Referring to FIG. 5 in reference to FIG. 1, the drain cleaner apparatus 200 is configured to dispense a cleaning composition 230 into a condensate drain line 124 of the air handler 102 shown in FIG. 1.

The drain cleaner apparatus 200 shown in FIG. 5 may include some or all of the same elements as the drain cleaner apparatus of any of the example embodiments. For example, the example embodiments shown in FIG. 5 include an apparatus reservoir 202 configured to directly hold cleaning composition 230, similarly to the example embodiments shown in FIGS. 2A and 2B, but it will be understood that the drain cleaner apparatus 200 shown in FIG. 5 may be configured to couple with a cartridge 300 as shown in FIGS. 3A and 3B instead of cleaning composition 230 being directly held (e.g., poured into) the apparatus reservoir 202 and/or the apparatus reservoir 202 may be entirely absent (e.g., where the dispenser device 204 is configured to couple with a cartridge 300 that is external to housing 201). Additionally, the drain cleaner apparatus 200 shown in FIG. 5 may include the dispenser device 204 shown in FIG. 4. Conversely, it will be understood that the drain cleaner apparatus 200 according to any of the example embodiments (e.g., the example embodiments shown in FIGS. 2A and 3B, the example embodiments shown in FIGS. 3A and 3B, the example embodiments shown in FIG. 4, or the like) may include some or all of the elements of the drain cleaner apparatus 200 as shown in FIG. 5.

Referring to FIG. 5, in some example embodiments, the drain cleaner apparatus 200 may include a moisture sensor 502 configured to extend through the opening 125 into the condensate drain line 124 based on the connector interface 208 being connected to the condensate drain line 124. The moisture sensor 502 may be any known moisture sensor, for example a sensor device that is configured to receive electrical power from power supply 212 (either directly or via controller 210 and including a switch that is closed in response to contact with a liquid such as water). The moisture sensor 502 may thus be configured to generate a signal based on contacting condensate backup in the condensate drain line 124.

Such a signal may be used (e.g., may be processed by controller 210) to make a determination that a backflow and/or overflow of condensate 120 in the condensate drain line 124 is occurring and/or is about to occur. The signal may be used to prompt a shutdown of at least a portion of the air conditioning system 100 (e.g., at least the air handler 102, including shutdown of at least one of the air mover 108, compressor 150, and/or air mover 154) which may reduce or stop accumulation of condensate 120 in the drip pan 122 and the condensate drain line 124, which may therefore reduce or prevent damage to the air handler 102 and/or structure 1 that may otherwise result from the backflow and/or overflow of condensate 120 in the condensate drain line 124.

In some example embodiments, the drain cleaner apparatus 200 may include a bypass device 506 that is configured to be actuated to cause at least the air handler 102 to shut down based on the signal generated by the moisture sensor 502. Such a bypass device may be a float switch bypass device that, when actuated, generates a signal that is transmitted to the controller 140 of the air conditioning system 100 and bypasses the float switch 160 of the air conditioning system 100 to serve as a float switch signal and thus cause the controller 140 to shut down some or all of the air conditioning system 100 (e.g., at least the air handler 102), which may include shutting down at least one of the air mover 108, compressor 150, and/or air mover 154.

In the example embodiments shown in FIG. 5, the bypass device 506 is a separate device in a housing 508 that is attached to the housing 201 of the drain cleaner apparatus 200, but example embodiments are not limited thereto. For example, the bypass device 506 may be included in and/or may be implemented by the controller 210, such that the controller 210 may generate a signal that causes the controller 140 to shut down some or all of the air conditioning system 100 (e.g., at least the air handler 102), which may include shutting down at least one of the air mover 108, compressor 150, and/or air mover 154. In some example embodiments, the controller 210 may be communicatively coupled between the moisture sensor 502 and the bypass device 506 (e.g., switch), and the controller 210 may be configured to actuate the bypass device 506 in response to the controller 210 processing a signal generated by the moisture sensor 502 to determine that the bypass device 506 is to be actuated.

In some example embodiments, the bypass device 506, the controller 210, and/or the network communication interface 224 may be communicatively coupled to the controller 140 of the air conditioning system to enable communication of a shutdown signal to the controller 140 in response to the signal generated by the moisture sensor 502. Such a communication coupling may be a wired communication link between the drain cleaner apparatus 200 and the controller 140, a wireless network communication link between the drain cleaner apparatus 200 and the controller 140. For example, the air conditioning system 100 may include a network communication interface 142 separate from, included in, and/or implemented by controller 140, and the controller 210, and/or the network communication interface 224 may be communicatively coupled to the controller 140 of the air conditioning system via a network communication link (e.g., wireless network communication link) between network communication interface 224 and a corresponding network communication interface 142 coupled to, included in, and/or implemented by controller 140 of the air conditioning system 100.

Still referring to FIG. 5, the drain cleaner apparatus 200 may include a containment tube 504 configured to extend through the opening 125 into the condensate drain line 124 based on the connector interface 208 being connected to the condensate drain line 124. As shown, the moisture sensor 502 may be located within an interior of the containment tube 504, and the containment tube 504 may have an open end 503 that is exposed to the interior of the condensate drain line 124. As a result, the containment tube 504 may be configured to isolate the moisture sensor 502 from generating a signal based on the cleaning composition 230 being dispensed by the dispenser device 204 through the apparatus outlet 206, thereby reducing or preventing the risk of a false-positive signal being generated by the moisture sensor 502. The containment tube 504 may further be configured to expose the moisture sensor 502 to the condensate drain line 124 through the open end 503 of the containment tube 504, to enable a condensate 120 backup in the condensate drain line 124 to pass into the interior of the containment tube 504 to contact the moisture sensor 502 and thus enable the moisture sensor 502 to generate the signal indicating condensate 120 backflow/overflow.

While FIG. 5 shows the bypass device 506, in some example embodiments the bypass device 506 and housing 508 may be omitted and the controller 210 may be communicatively coupled to the float switch 160 of the air handler 102 and may be configured to cause the float switch 160 to actuate to cause some or all of the air conditioning system 100 to shut down (e.g., based on operation of the controller 140 in response to float switch 160 actuation) based on the signal generated by the moisture sensor 502.

In some example embodiments, the drain cleaner apparatus 200 may include a network communication interface 224 that is configured to establish a network communication link with a remote computing device, as described herein, and the controller 210 may be configured to generate and transmit a warning signal to the remote computing device via the network communication link in response to detection of the signal generated by the moisture sensor 502. As a result, the drain cleaner apparatus 200 may be configured to warn a human user supported by the remote computing device of the occurrence of the detected backflow/overflow of condensate 120 in the condensate drain line 124.

Figure 6:
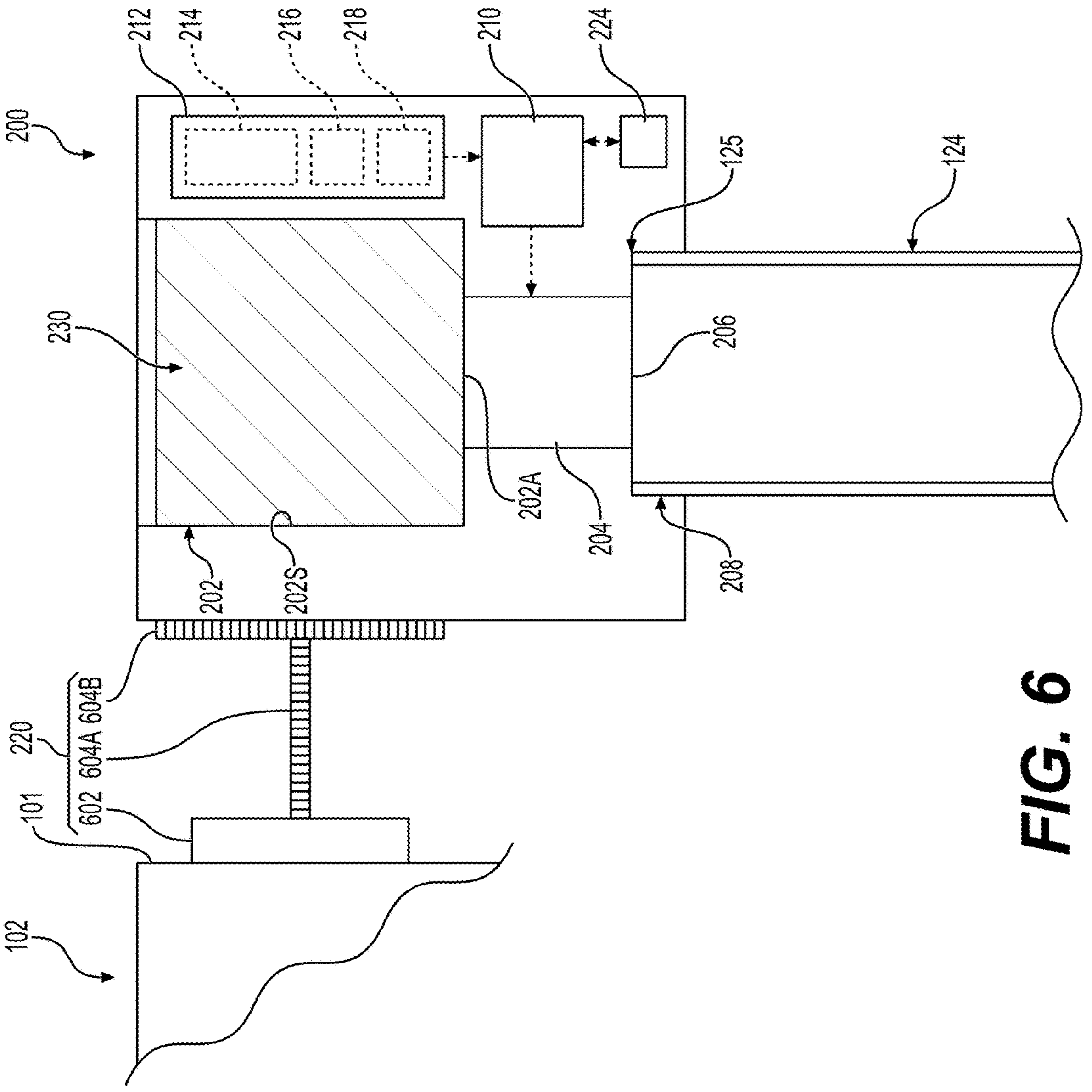
FIG. 6 is a schematic view of a drain cleaner apparatus including a structure connector according to some example embodiments.

FIG. 6 is a schematic view of a drain cleaner apparatus 200 including a structure connector 220 according to some example embodiments. Referring to FIG. 6 in reference to FIG. 1, the drain cleaner apparatus 200 is configured to dispense a cleaning composition 230 into a condensate drain line 124 of the air handler 102 shown in FIG. 1.

The drain cleaner apparatus 200 shown in FIG. 6 may include some or all of the same elements as the drain cleaner apparatus of any of the example embodiments. For example, the example embodiments shown in FIG. 6 include an apparatus reservoir 202 configured to directly hold cleaning composition 230, similarly to the example embodiments shown in FIGS. 2A and 2B, but it will be understood that the drain cleaner apparatus 200 shown in FIG. 6 may be configured to couple with a cartridge 300 as shown in FIGS. 3A and 3B instead of cleaning composition 230 being directly held (e.g., poured into) the apparatus reservoir 202 and/or the apparatus reservoir 202 may be entirely absent (e.g., where the dispenser device 204 is configured to couple with a cartridge 300 that is external to housing 201). Additionally, the drain cleaner apparatus 200 shown in FIG. 6 may include the dispenser device 204 shown in FIG. 4. Additionally, the drain cleaner apparatus 200 shown in FIG. 6 may include the moisture sensor 502, containment tube 504, and/or bypass device 506 as shown in FIG. 5. Conversely, it will be understood that the drain cleaner apparatus 200 according to any of the example embodiments (e.g., the example embodiments shown in FIGS. 2A and 3B, the example embodiments shown in FIGS. 3A and 3B, the example embodiments shown in FIG. 4, the example embodiments shown in FIG. 5, or the like) may include some or all of the elements of the drain cleaner apparatus 200 as shown in FIG. 6.

In some example embodiments, the drain cleaner apparatus 200 may include a structure connector 220 that includes a coupler 602 that is configured to attach to an outer surface of an external structure, such as an outer surface of a housing 101 of the air handler 102. The coupler 602 may include a magnetic bracket (e.g., any known magnet) that is configured to magnetically attach to a metal surface of the external structure (e.g., a metal surface of the housing 101). The coupler 602 may enable the structure connector 220 to couple to the external structure to hold the drain cleaner apparatus 200 in place in relation to the condensate drain line 124.

In some example embodiments, the structure connector 220 may include a set of lateral and vertical adjustable brackets 604A and 604B, respectively. The lateral and vertical adjustable brackets 604A and 604B may each be an adjustable actuator and/or an adjustable bracket (e.g., adjustable mounting bracket), including for example an adjustable tooth bracket (e.g., an adjustable tooth gear, adjustable worm screw and/or worm gear, adjustable rack and pinion, etc.) that is configured to adjustably position the coupler 602, in both a horizontal direction and a vertical direction, respectively, in relation to a remainder of the drain cleaner apparatus 200. As a result, the set of lateral and vertical adjustable brackets 604A and 604B, together with the coupler 602, may enable adjustable positioning of the drain cleaner apparatus 200 in relation to the external structure (e.g., air handler 102) to which the coupler 602 is attached and/or in relation to the condensate drain line 124.

Figure 7:
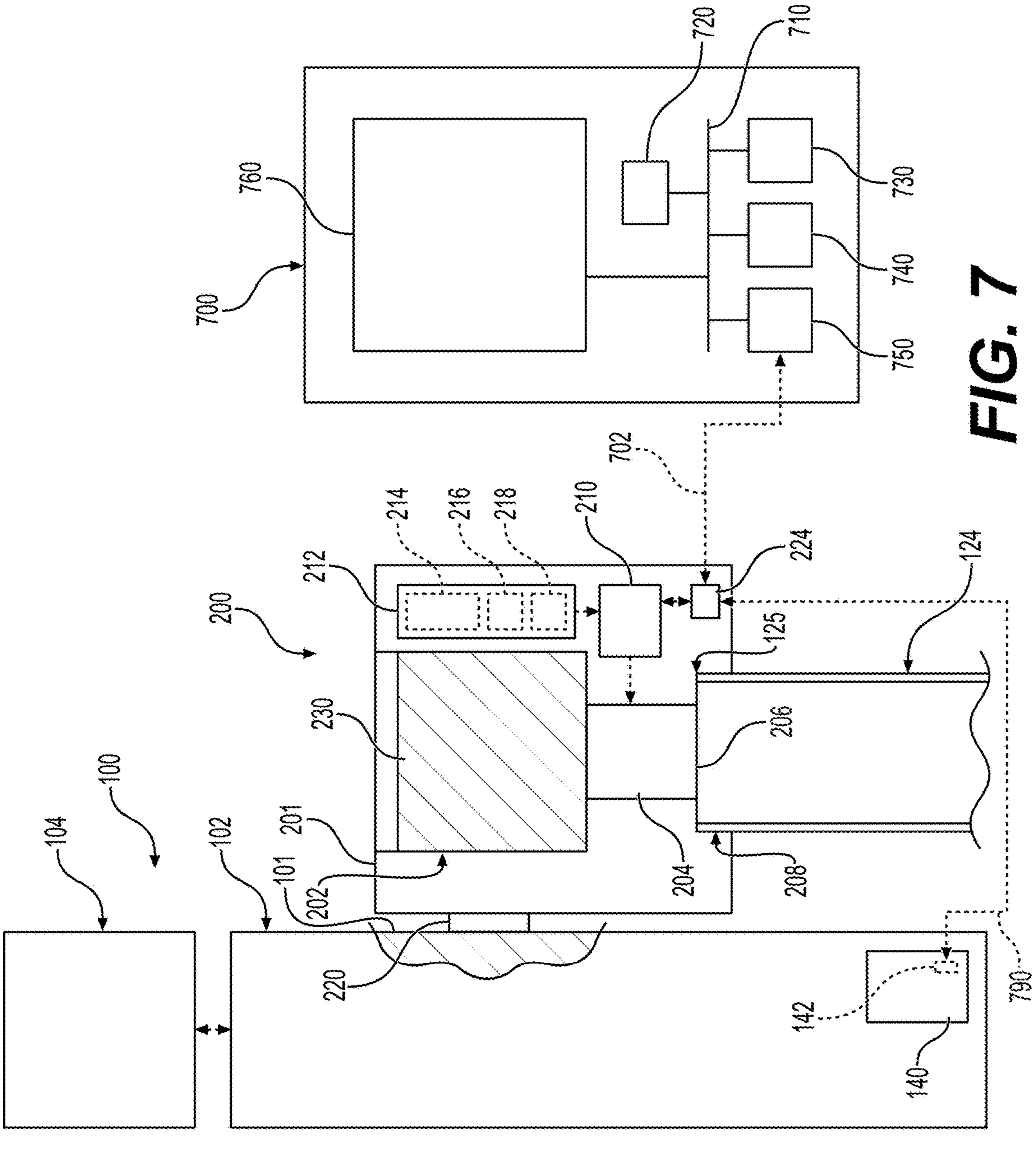
FIG. 7 is a schematic view of a drain cleaner apparatus and a remote computing device communicatively coupled via a network communication link according to some example embodiments.

FIG. 7 is a schematic view of a drain cleaner apparatus 200 and a remote computing device 700 communicatively coupled via a network communication link 702 according to some example embodiments. Referring to FIG. 7 in reference to FIG. 1, the drain cleaner apparatus 200 is configured to dispense a cleaning composition 230 into a condensate drain line 124 of the air handler 102 shown in FIG. 1.

The drain cleaner apparatus 200 shown in FIG. 7 may include some or all of the same elements as the drain cleaner apparatus of any of the example embodiments. For example, the example embodiments shown in FIG. 7 include an apparatus reservoir 202 configured to directly hold cleaning composition 230, similarly to the example embodiments shown in FIGS. 2A and 2B, but it will be understood that the drain cleaner apparatus 200 shown in FIG. 7 may be configured to couple with a cartridge 300 as shown in FIGS. 3A and 3B instead of cleaning composition 230 being directly held (e.g., poured into) the apparatus reservoir 202 and/or the apparatus reservoir 202 may be entirely absent (e.g., where the dispenser device 204 is configured to couple with a cartridge 300 that is external to housing 201). Additionally, the drain cleaner apparatus 200 shown in FIG. 7 may include the dispenser device 204 shown in FIG. 4. Additionally, the drain cleaner apparatus 200 shown in FIG. 7 may include the moisture sensor 502, containment tube 504, and/or bypass device 506 as shown in FIG. 5. Additionally, the drain cleaner apparatus 200 shown in FIG. 7 may include the structure connector 220 as shown in FIG. 6. Conversely, it will be understood that the drain cleaner apparatus 200 according to any of the example embodiments (e.g., the example embodiments shown in FIGS. 2A and 3B, the example embodiments shown in FIGS. 3A and 3B, the example embodiments shown in FIG. 4, the example embodiments shown in FIG. 5, the example embodiments shown in FIG. 6, or the like) may include some or all of the elements of the drain cleaner apparatus 200 as shown in FIG. 7.

In some example embodiments, the drain cleaner apparatus 200 includes a network communication interface 224 (e.g., a wireless network communication transceiver) that is configured to establish a network communication link with a remote computing device 700. The remote computing device 700 may be configured to support a human user.

As shown, the remote computing device 700 may include a processor 720 (e.g., a CPU), a memory 730 (e.g., a SSD), a power supply 740 (e.g., a rechargeable battery), a network communication interface 750 (e.g., a wireless network communication transceiver), and an interface 760 that may include a display device (e.g., an LED display panel, an OLED display panel, or the like) a button, a touchscreen display device, any combination thereof, or the like that are communicatively and/or electrically coupled via a bus connection 710.

At least some of the remote computing device 700, including for example the processor 720, the memory 730, the network communication interface 750, or any combination thereof, may be included in, and/or may be implemented by one or more instances (e.g., articles, pieces, units, etc.) of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), or any other device or devices capable of responding to and executing instructions in a defined manner. It will be understood that any type of non-transitory computer readable storage device may be used as the memory 730 in addition or alternative to an SSD. In some example embodiments, the processing circuitry may include a non-transitory computer readable storage device, or memory (e.g., memory 730), for example a solid state drive (SSD), storing a program of instructions, and a processor (e.g., processor 720) that is communicatively coupled to the non-transitory computer readable storage device (e.g., via a bus connection 710) and configured to execute the program of instructions to implement the functionality of some or all of any of the devices and/or mechanisms of any of the example embodiments and/or to implement some or all of any of the methods of any of the example embodiments. It will be understood that, as described herein, an element (e.g., processing circuitry, digital circuits, any part of the remote computing device 700) will be understood to implement the functionality of said implemented element (e.g., the functionality of the remote computing device 700).

As shown, the network communication interface 224 of the drain cleaner apparatus 200 may be configured to establish a network communication link 702 with the remote computing device 700 (e.g., with network communication interface 750) and may be configured to implement one-way or two-way communication between the drain cleaner apparatus 200 and the remote computing device 700.

In some example embodiments, the controller 210 is configured to generate and transmit signals to the remote computing device 700 via the wireless network communication link 702.

In some example embodiments, the controller 210 may communicate signals over the network communication link 702 that indicate operations of the controller 210 (e.g., indicating actuation of the dispenser device 204 at particular points in time, a present timer value, a present counter value, etc.). In some example embodiments, the controller 210 may communicate the depletion signal (generated in response to the counter value reaching a threshold value) to the remote computing device 700 via the network communication link 702.

In some example embodiments, the controller 210 may be configured to perform operations in response to receiving signals from the remote computing device 700 via the network communication link 702. Such signals may be generated at the remote computing device 700 based on operation of at least a portion of the remote computing device 700 (e.g., based on operation of the processor 720), which may be based on human user interaction with at least a portion of an interface of the remote computing device 700 (e.g., the display screen interface 760, which may be a touchscreen display). For example, the remote computing device 700 may generate a reset signal based on human interaction with a touchscreen display interface 760 to indicate that the amount of cleaning composition 230 held in the drain cleaner apparatus 200 has been replenished (e.g., via replacement of a cartridge 300 coupled to the drain cleaner apparatus 200). The remote computing device 700 may transmit the reset signal to the drain cleaner apparatus 200 via the network communication link 702, and the controller 210 may be configured to cause the counter value of the counter value to be reset to an initial counter value (e.g., 0) in response to receiving the reset signal from the remote computing device 700 via the network communication link 702. As a result, a human user may be able to remotely reset the counter value used by the drain cleaner apparatus 200 in response to cleaning composition 230 replenishment without direct interaction with the drain cleaner apparatus (e.g., via a button on the drain cleaner interface).

Referring to FIGS. 5 and 7, in some example embodiments, the controller 210 may be configured to generate and transmit a warning signal to the remote computing device 700 via the network communication link 702 in response to detection of a signal generated by the moisture sensor 502. As a result, the drain cleaner apparatus 200 may be configured to warn a human user supported by the remote computing device 700 of the occurrence of the detected backflow/overflow of condensate 120 in the condensate drain line 124.

In some example embodiments, the controller 210 may be configured to cause some or all of the air conditioning system 100 to shut down in response to receiving a shutdown command signal from the remote computing device 700 via the network communication link 702. For example, the remote computing device 700 may display a warning notification to a supported user (e.g., via display screen interface 760) in response to receiving the warning signal to the remote computing device 700. The remote computing device 700 may enable the human user to interact with the interface 760 (e.g., a touchscreen display) to command the remote computing device 700 to transmit a shutdown signal to the drain cleaner apparatus 200 in response to the warning signal via the network communication link 702. The remote computing device 700 may transmit the shutdown signal to the drain cleaner apparatus 200 via the network communication link 702. The controller 210 may generate a signal to cause some or all of the air conditioning system 100 to shut down (e.g., transmit a signal to the controller 140 via a network communication link 790 with a network communication interface of the air conditioning system 100 that may be included in and/or implemented by controller 140) to cause the controller 140 to shut down some or all of the air conditioning system 100, actuate the bypass device 506 and/or the float switch 160, etc.) in response to receiving the shutdown signal.

In some example embodiments, the remote computing device 700 may enable the human user to interact with the interface 760 (e.g., via a touchscreen display) to command the remote computing device 700 to transmit a dispensing signal to the drain cleaner apparatus 200 to cause the controller 210 to implement an immediate actuation of the dispenser device 204 to immediately dispense an amount of the cleaning composition 230, thereby allowing more frequent or user-commanded dispensings of cleaning composition. The remote computing device may transmit the dispensing signal to the drain cleaner apparatus 200 via the network communication link 702, and the controller 210 may actuate the dispenser device 204 in response to receiving the dispensing signal.

Figure 8:
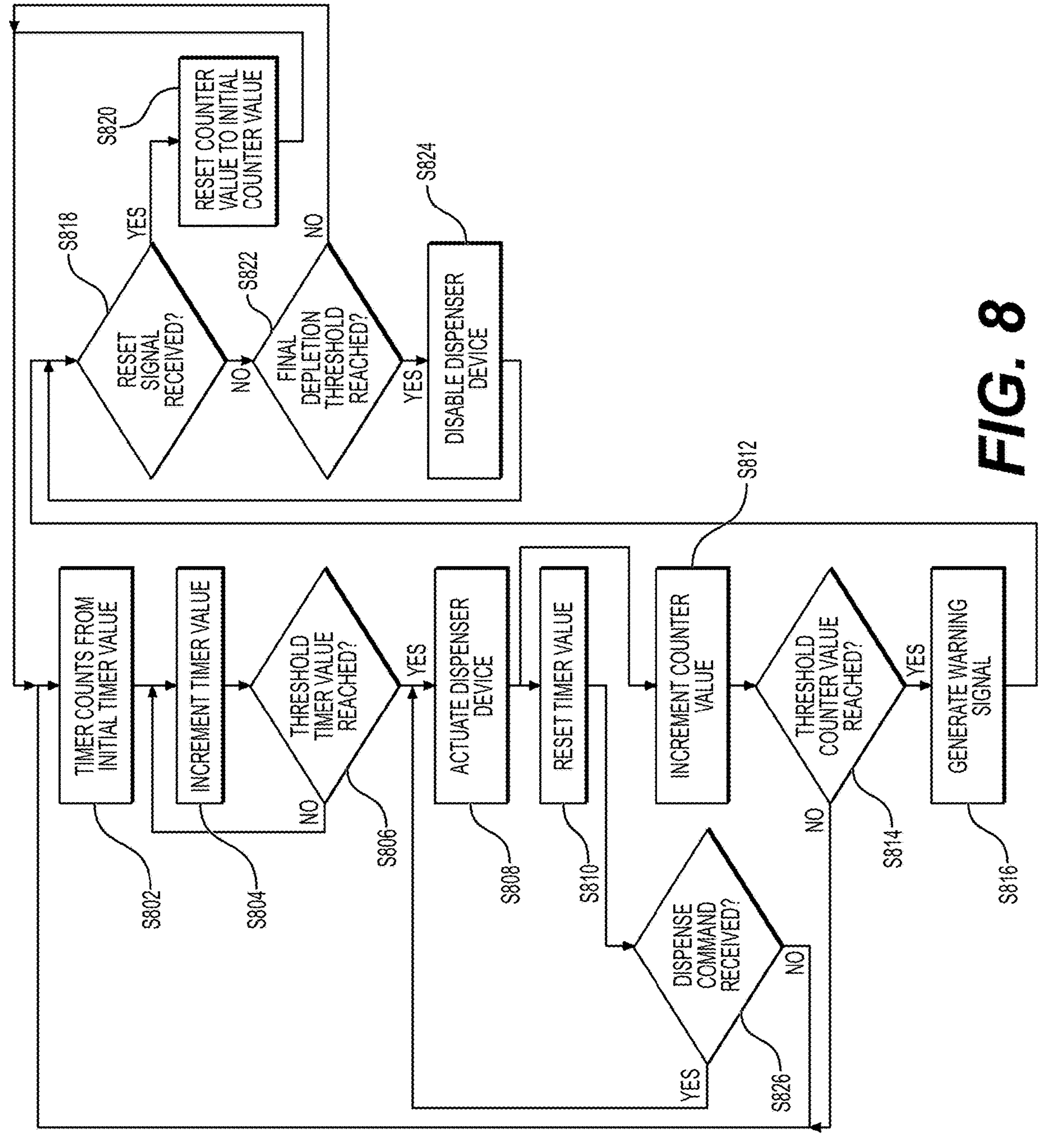
FIG. 8 is a flowchart illustrating a method of operation of the drain cleaner apparatus according to some example embodiments.

FIG. 8 is a flowchart illustrating a method of operation of the drain cleaner apparatus according to some example embodiments. The method shown in FIG. 8 may be implemented by any example embodiment of the drain cleaner apparatus 200 according to any example embodiments.

It will be understood that operations of the method shown in FIG. 8 may be changed in order relative to what is shown in FIG. 8. It will further be understood that one or more operations of the method shown in FIG. 8 may be omitted from the method shown in FIG. 8. It will further be understood that one or more operations may be added to the method shown in FIG. 8.

The method shown in FIG. 8 includes a method for operating a drain cleaner apparatus 200 according to any of the example embodiments to dispense a cleaning composition 230 into a condensate drain line 124 of an air handler 102, where the drain cleaner apparatus 200 is coupled with the condensate drain line 124 such that an apparatus outlet 206 of the drain cleaner apparatus 200 is in fluid communication with an opening 125 of the condensate drain line 124. As shown, the method of FIG. 8 includes controlling a dispenser device 204 of the drain cleaner apparatus 200 to cause the dispenser device 204 to selectively dispense an amount (e.g., 3 oz) of the cleaning composition 230 from an apparatus reservoir 202 of the drain cleaner apparatus 200 and through the apparatus outlet 206 without manual intervention (e.g., without human intervention). It will be understood that some or any of the operations shown in FIG. 8 may be performed (e.g., performed by controller 210) without human intervention (e.g., some or any operations may be performed by controller 210 based on programming of the controller 210 and may be performed independently of any commands or signals received at the controller 210 based on human interaction with an interface (e.g., button, touchscreen display, etc.).

At S802 and S804, a timer of the controller 210 may count (e.g., increment a timer value at a fixed frequency) from an initial timer value (e.g., 0). At S806, the controller 210 compares the timer value with a threshold (e.g., particular) timer value (e.g., 7 days) that may be stored at the controller 210 and determines whether the present timer value has reached (e.g., is equal to or greater than) the threshold timer value. If not, the controller 210 permits the timer to continue to increment at S804. If so, at S808, the controller 210 actuates the dispenser device 204 in response to cause the dispenser device 204 to dispense a particular amount of cleaning composition 230 (e.g., 3 oz), thereby actuating the dispenser device 204 in response to an elapse of a particular period of time.

The amount of cleaning composition 230 that is dispensed at S808 may be based on structural features of the dispenser device 204 and control thereof. For example, referring to FIG. 4, in example embodiments where the dispenser device 204 includes a dispenser reservoir 406 that is configured to hold the amount of the cleaning composition (e.g., 3 oz internal value), a first valve 402 between the apparatus reservoir 202 and the dispenser reservoir 406 and configured to be actuated to selectively open or close a first flow path 402A between the apparatus reservoir 202 and the dispenser reservoir 406, and a second valve 404 between the dispenser reservoir 406 and the apparatus outlet 206 and configured to be actuated to selectively open or close a second flow path 404A between the dispenser reservoir 406 and the apparatus outlet 206, the actuating of the dispenser device at S808 may include generating a signal to cause the first valve 402 to open the first flow path 402A for a first period of time (e.g., 5 seconds), to enable the dispenser reservoir 406 to be filled (e.g., completely filled) with the amount of the cleaning composition 230 (e.g., an amount corresponding to the internal volume of the dispenser reservoir 406) from the apparatus reservoir 202, and, in response to an elapse of the first period of time, causing the first valve 402 to close the first flow path 402A to isolate the dispenser reservoir 406 from the apparatus reservoir 202 and causing the second valve 404 to open the second flow path 404A to enable the amount of the cleaning composition to flow from the dispenser reservoir 406 to the apparatus outlet 206 and thus to be dispensed through opening 125 into the condensate drain line 124.

At S810, in response to the actuating at S808, the controller 210 causes the timer to reset to the initial timer value (0) and resume counting to enable a repeated performance of S802-S808 (at least partially depending upon an outcome of the determination at S826, described further below), thereby repeatedly actuating the dispenser device 204 at a fixed time interval that is the particular period of time, based on monitoring a timer that increments a timer value at a fixed frequency at S802-S806, actuating the dispenser device 204 at S808 in response to the timer value reaching a particular time value corresponding to the elapse of the particular period of time, and resetting the timer value to an initial timer value at S810 in response to actuating the dispenser device at S808.

At S812, in response to the actuating at S808, the controller 210 causes a counter to count (e.g., increment) a counter value from an initial counter value (e.g., 0), thereby tracking a quantity of actuations (S808) and thus a cumulative amount of cleaning composition 230 dispensed.

At S814 the controller 210 compares the counter value with a threshold (e.g., particular) counter value (e.g., 10, 11, 12, etc.) that may be stored at the controller 210 and determines whether the present counter value has reached (e.g., is equal to or greater than) the threshold counter value. If not, the controller 210 returns to S802 and continues the method. If so, at S816, the controller 210 generates a warning signal. The controller 210 may monitor multiple possible threshold values, including a partial depletion threshold counter value (e.g., 10 and/or 11) and a final depletion threshold counter value (e.g., 12) and the controller 210 may generate a particular warning signal (e.g., indicating partial depletion or final depletion (e.g., complete depletion) of cleaning composition 230 held in the drain cleaner apparatus 200) based on which threshold is determined to be reached at S814.

At S818, a determination is made regarding whether to reset the counter to the initial counter value. The determination may include a determination of whether a reset signal that indicates a command to reset the counter value is received. Such a determination may be based upon receiving a reset signal, which may be received from a counter reset interface 222 of the drain cleaner apparatus 200 (e.g., a button) and/or from a remote computing device 700 via a network communication link 702 (e.g., via network communication interface 224). If a reset is determined to be commanded at S818 (e.g., a reset signal is determined to be received at S818), at S820 the controller 210 resets the counter value to the initial counter value. If not, at S822 a further determination is made regarding whether the threshold determined to be reached at S814 is a final depletion threshold (e.g., 12) that indicates complete depletion (e.g., final depletion) of cleaning composition 230 in the drain cleaner apparatus 200. If not, (e.g., a partial depletion threshold of 11 was determined to be reached at S814), then the method returns to S802. If so, at S824 the controller 210 may inhibit further operation of the dispenser device 204 (e.g., disable the dispenser device 204) until a determination is made at S818 to perform a reset at S820 (e.g., until a reset signal is determined to be received at S818). Such operations at S822 and S824 may reduce or prevent the likelihood of the drain cleaner apparatus 200 continuing to actuate the dispenser device 204 in the absence of cleaning composition 230 in the drain cleaner apparatus 200. At S824, the controller 210 may further generate another warning signal indicating that the dispenser device 204 is inhibited (e.g., disabled). Additionally or alternatively, such an indication may be included in the warning signal generated at S816 in response to a determination at S814 that a final threshold counter value is reached.

At S826, a determination is made regarding whether a dispensing command is received, for example based on human interaction with an interface (e.g., button) of the drain cleaner apparatus 200 and/or based on a dispensing signal being receive from a remote computing device 700 via a network communication link based on a dispensing of cleaning composition 230 being commanded at the remote computing device 700. If not, the method continues at S802. If so, the method moves to S808 and the controller 210 actuates the dispenser device 204.

Figure 9:
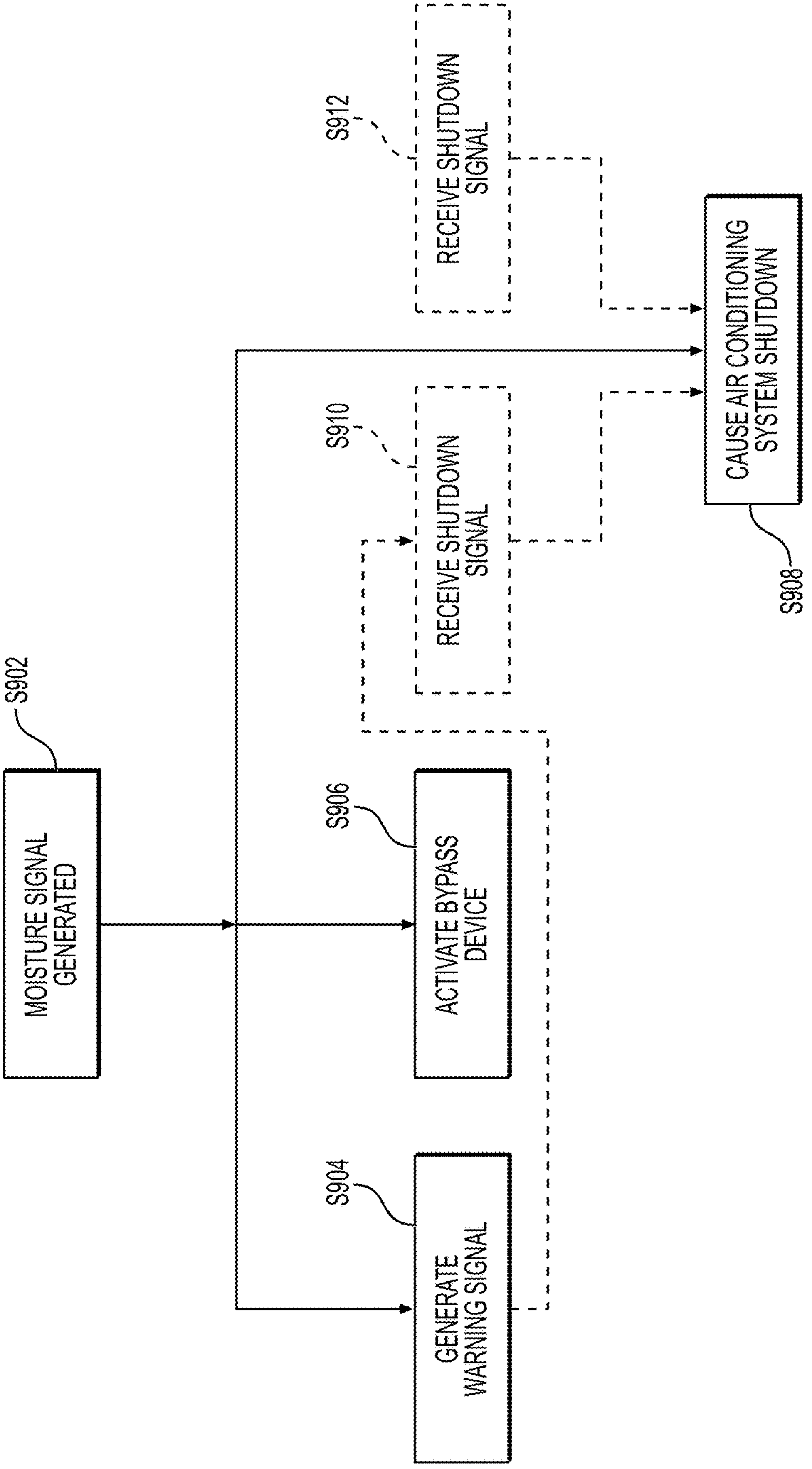
FIG. 9 is a flowchart illustrating a method of operation of the drain cleaner apparatus according to some example embodiments.

FIG. 9 is a flowchart illustrating a method of operation of the drain cleaner apparatus according to some example embodiments. The method shown in FIG. 9 may be implemented by any example embodiment of the drain cleaner apparatus 200 according to any example embodiments.

It will be understood that operations of the method shown in FIG. 9 may be changed in order relative to what is shown in FIG. 9. It will further be understood that one or more operations of the method shown in FIG. 9 may be omitted from the method shown in FIG. 9. It will further be understood that one or more operations may be added to the method shown in FIG. 9.

At S902, a moisture sensor 502 of the drain cleaner apparatus 200, which is coupled to the condensate drain line 124 such that the moisture sensor 502 is within the condensate drain line 124, generates a signal in response to contact thereof with moisture (e.g., liquid, including water) within a condensate drain line 124. Such moisture (e.g., liquid) may contact the moisture sensor 502 based on entering an open end 503 of a containment tube 504 in which the moisture sensor 502 is located.

At S904, the controller 210 generates a warning signal in response to receiving and processing the signal generated by the moisture sensor 502 at S902. The controller 210 may cause the warning signal to be transmitted to a remote computing device 700 via a network communication link 702 therewith according to any example embodiments.

At S906, the controller 210 may generate a shutdown signal that causes some or all of the air conditioning system 100 (e.g., at least the air handler 102) to shut down in response to receiving and processing the signal generated by the moisture sensor 502 at S902. The controller 210 may transmit the signal to a bypass device 506 to actuate the bypass device 506 which causes the controller 140 of the air conditioning system 100 to partially or completely shut down the air conditioning system 100 as described herein. At S906, the controller 210 may transmit the signal to a float switch 160 of the air conditioning system 100, additionally or alternatively to transmitting the signal to the bypass device 506, to actuate the float switch 160 which causes the controller 140 of the air conditioning system 100 to partially or completely shut down the air conditioning system 100 as described herein.

At S908, the controller 210 may generate a shutdown signal that causes at least a portion of the air conditioning system 100 (e.g., at least the air handler 102) to shut down in response to receiving and processing the signal generated by the moisture sensor 502 at S902. The controller 210 may transmit the shutdown signal directly to the controller of the air conditioning system where the signal is processed by the controller 140 and cusses the controller 140 to shut down some or all of the air conditioning system 100 (e.g., shut down at least the air handler 102) as described herein.

As shown in FIG. 9, in some example embodiments, the controller 210 may receive a shutdown signal at S910 from a remote computing device 700, subsequently to transmitting the warning signal to the remote computing device 700 at S904. The remote computing device 700 may generate the shutdown signal automatically (e.g., without human intervention) in response to receiving the warning signal that is generated at S904. The remote computing device 700 may generate the shutdown signal in response to human user interaction with the remote computing device 700.

As shown in FIG. 9, in some example embodiments, the controller 210 may receive a shutdown signal at S912 from a remote computing device 700. The remote computing device 700 may generate the shutdown signal automatically (e.g., without human intervention) or in response to human user interaction with the remote computing device 700. The shutdown signal may be received at S912 independently of any warning signal generated at S904—while the shutdown signal may be generated at the remote computing device 700 and transmitted to the drain cleaner apparatus 200 to be received at the controller 210 at S910 in response to the warning signal generated at S904, the shutdown signal that is generated at the remote computing device 700 and transmitted to the drain cleaner apparatus 200 to be received at the controller 210 at S912 may be generated, transmitted, and received independently of any signal generated at the drain cleaner apparatus 200.

In some example embodiments, the controller 210 may generate a shutdown signal at S908 that causes some or all of the air conditioning system 100 (e.g., at least the air handler 102) to shut down in response to receiving the shutdown command at S910 and/or S912. In some example embodiments, the controller 210 may generate a shutdown signal at S908 independently of any signal generated by the moisture sensor at S902 (e.g., the controller 210 may generate a shutdown signal at S908 in response to receiving the shutdown signal at S912).

Figure 10:
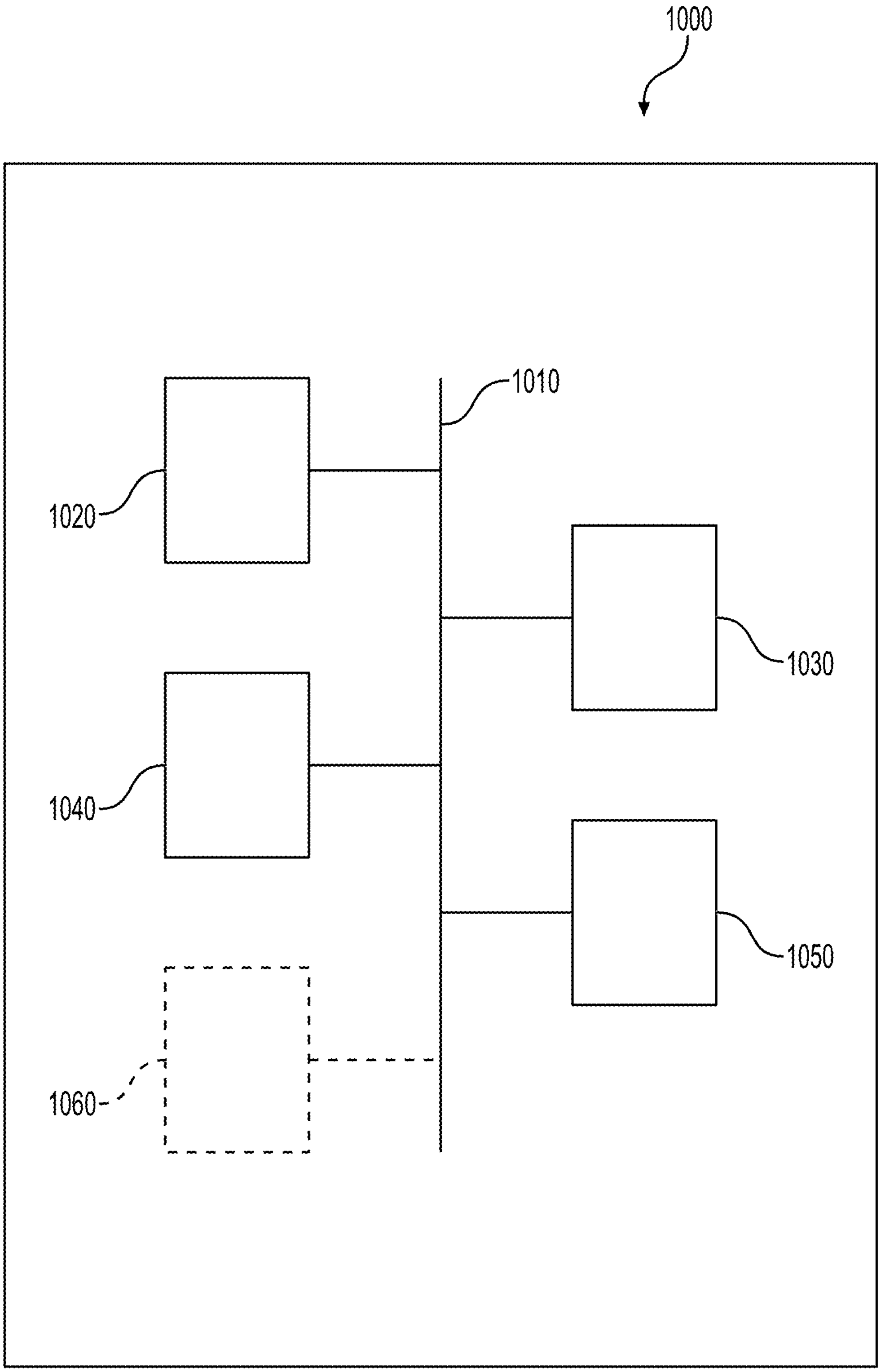
FIG. 10 is a schematic view of a computing device according to some example embodiments.

FIG. 10 is a schematic view of a controller of a computing device 1000 according to some example embodiments. The computing device 1000 may implement any of the computing devices, controllers, processors, or the like according to any of the example embodiments, including controller 140, controller 210, and any portion of remote computing device 700.

As shown in FIG. 10, the computing device 1000 may include some or all of a processor 1020 (e.g., a CPU), a memory 1030 (e.g., a solid state drive, or SSD), a communication interface 1040 (e.g., a wireless network communication interface, which may for example implement network communication interface 224, network communication interface 750, network communication interface 142, a network communication interface of the air conditioning system 100, or the like), and a power supply 1050 that are communicatively coupled together via a bus connection 1010. It will be understood that any type of non-transitory computer readable storage device may be used as the memory 1030 in addition or alternative to an SSD. The computing device 1000 may include additional devices, including a user interface device 1060 (e.g., "interface") that may include a display device (e.g., an LED display screen, OLED display screen, etc.), a touchscreen display, a button interface, any combination thereof, or the like. The user interface device 1060 may be communicatively coupled to the bus connection 1010.

In some example embodiments, some or all of any of the computing device 1000 may include, may be included in, and/or may be implemented by one or more instances (e.g., articles, pieces, units, etc.) of processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), or any other device or devices capable of responding to and executing instructions in a defined manner. In some example embodiments, the processing circuitry may include a non-transitory computer readable storage device, or memory (e.g., memory 1030), for example a solid state drive (SSD), storing a program of instructions, and a processor (e.g., processor 1020) that is communicatively coupled to the non-transitory computer readable storage device (e.g., via a bus connection 1010) and configured to execute the program of instructions to implement the functionality of some or all of any of the devices and/or mechanisms of any of the example embodiments and/or to implement some or all of any of the methods of any of the example embodiments. It will be understood that, as described herein, an element (e.g., processing circuitry, digital circuits, etc.) that is described as "implementing" an element (e.g., controller 210, drain cleaner apparatus 200, controller 140, air conditioning system 100, remote computing device 700, etc.) will be understood to implement the functionality of said implemented element and/or any other elements (e.g., the functionality of the controller 210, the functionality of the drain cleaner apparatus 200, the functionality of the controller 140, the functionality of the air conditioning system, the functionality of the remote computing device 700, etc.).

Example embodiments have been disclosed herein; it should be understood that other variations may be possible. Such variations are not to be regarded as a departure from the spirit and scope of the present disclosure, and all such modifications as would be obvious to one skilled in the art are intended to be included within the scope of the following claims.

I claim:

1. A drain cleaner apparatus for dispensing a cleaning composition into a condensate drain line of an air handler of an air conditioning system, the drain cleaner apparatus comprising:

an apparatus outlet that is configured to be in fluid communication with an opening of the condensate drain line based on the drain cleaner apparatus being coupled to the opening of the condensate drain line;

a dispenser device that is configured to be actuated to selectively dispense an amount of the cleaning composition through the apparatus outlet;

a controller configured to actuate the dispenser device to cause the amount of the cleaning composition to be dispensed through the apparatus outlet without manual intervention; and a moisture sensor configured to generate a signal based on contacting condensate backup in the condensate drain line.

2. The drain cleaner apparatus of claim 1, wherein the dispenser device includes at least one valve that is configured to be selectively opened based on a control signal generated by the controller to establish a flow path through the at least one valve to the apparatus outlet.

3. The drain cleaner apparatus of claim 1, wherein the dispenser device includes a pump that is configured to operate for a particular period of time based on a control signal generated by the controller to move the amount of the cleaning composition to the apparatus outlet.

4. The drain cleaner apparatus of claim 1, further comprising:

a structure connector that is configured to connect the drain cleaner apparatus to an external structure to at least partially hold the drain cleaner apparatus in place in relation to the opening of the condensate drain line.

5. The drain cleaner apparatus of claim 1, wherein the drain cleaner apparatus is configured to cause at least a portion of the air conditioning system to shut down in response to the signal generated by the moisture sensor.

6. The drain cleaner apparatus of claim 1, wherein the drain cleaner apparatus is configured to cause a float switch of the air handler to actuate to cause at least a portion of the air conditioning system to shut down based on the signal generated by the moisture sensor.

7. The drain cleaner apparatus of claim 1, further comprising:

a network communication interface device that is configured to establish a network communication link with a remote computing device, wherein the controller is configured to transmit a warning signal to the remote computing device via the network communication link based on the signal generated by the moisture sensor.

8. The drain cleaner apparatus of claim 1, wherein the drain cleaner apparatus is configured to detachably couple with a cartridge, the cartridge including a cartridge reservoir configured to hold the cleaning composition, and a cartridge outlet, and the drain cleaner apparatus is configured to detachably couple with the cartridge such that the cartridge reservoir is in fluid communication with the dispensing device via the cartridge outlet.

9. The drain cleaner apparatus of claim 8, wherein the drain cleaner apparatus or the cartridge includes a check valve that is configured to open in response to the drain cleaner apparatus detachably coupling with the cartridge to establish the fluid communication between the dispenser device and the cartridge reservoir of the cartridge via the cartridge outlet.

10. The drain cleaner apparatus of claim 9, wherein the controller is configured to repeatedly actuate the dispenser device at a fixed time interval that is an elapse of a particular period of time, based on monitoring a timer that increments a timer value at a fixed frequency, actuating the dispenser device in response to the timer value reaching a particular time value corresponding to the elapse of the particular period of time, and resetting the timer value to an initial timer value in response to actuating the dispenser device.

11. The drain cleaner apparatus of claim 10, wherein the controller is configured to monitor a counter that increments a counter value in response to each actuation of the dispenser device, and generate a depletion signal in response to the counter value reaching a particular counter value that corresponds to at least partial depletion of a fixed reservoir of the cleaning composition.

12. The drain cleaner apparatus of claim 11, further comprising:

a counter reset interface that is configured to cause the counter value to be reset to an initial counter value in response to human interaction with the counter reset interface.

13. The drain cleaner apparatus of claim 11, further comprising:

a network communication interface device that is configured to establish a network communication link with a remote computing device, wherein the controller is configured to cause the depletion signal to be transmitted to the remote computing device via the network communication link, and cause the counter value to be reset to an initial counter value in response to receiving a reset signal from the remote computing device via the network communication link.

14. A method for operating a drain cleaner apparatus, the drain cleaner apparatus configured to be coupled with a condensate drain line of an air handler of an air conditioning system such that an apparatus outlet of the drain cleaner apparatus is in fluid communication with an opening of the condensate drain line, the method comprising:

controlling a dispenser device of the drain cleaner apparatus to cause the dispenser device to selectively dispense an amount of a cleaning composition through the apparatus outlet without manual intervention; and generating a signal at a moisture sensor of the drain cleaner apparatus in response to the moisture sensor contacting condensate backup in the condensate drain line.

15. The method of claim 14, further comprising:

causing at least a portion of the air conditioning system to shut down based on processing the signal generated by the moisture sensor.

16. The method of claim 14, further comprising:

causing a float switch of the air handler to actuate to cause at least a portion of the air conditioning system to shut down based on processing the signal generated by the moisture sensor.

17. The method of claim 14, further comprising:

repeatedly actuating the dispenser device at a fixed time interval that is an elapse of a particular period of time, based on monitoring a timer that increments a timer value at a fixed frequency, actuating the dispenser device in response to the timer value reaching a particular time value corresponding to the elapse of the particular period of time, and resetting the timer value to an initial timer value in response to actuating the dispenser device.

18. The method of claim 17, further comprising:

monitoring a counter that increments a counter value in response to each actuation of the dispenser device, and generating a depletion signal in response to the counter value reaching a particular counter value that corresponds to at least partial depletion of a fixed reservoir of the cleaning composition.

19. The method of claim 18, further comprising:

causing the counter value to be reset to an initial counter value in response to receiving a reset signal.

* * * * *